US011885679B2

(12) United States Patent
Dunning et al.

(10) Patent No.: US 11,885,679 B2
(45) Date of Patent: Jan. 30, 2024

(54) MOBILE DEVICES FOR CHEMICAL ANALYSIS AND RELATED METHODS

(71) Applicant: Lantha, Inc., Austin, TX (US)

(72) Inventors: Samuel George Dunning, Washington, DC (US); Robert Toker, Spicewood, TX (US); Simon M. Humphrey, Lakeway, TX (US); Samuel T. Chill, Austin, TX (US); Dong Sub Kim, Austin, TX (US); Talitha Vanwie, Taylor, TX (US)

(73) Assignee: LANTHA, INC., Austin, TX (US)

( * ) Notice: Subject to any disclaimer, the term of this patent is extended or adjusted under 35 U.S.C. 154(b) by 0 days.

(21) Appl. No.: 17/465,755

(22) Filed: Sep. 2, 2021

(65) Prior Publication Data

US 2021/0396576 A1 Dec. 23, 2021

Related U.S. Application Data

(63) Continuation of application No. 17/228,549, filed on Apr. 12, 2021, now Pat. No. 11,156,499, which is a
(Continued)

(51) Int. Cl.
*G01N 21/31* (2006.01)
*G01J 3/02* (2006.01)
(Continued)

(52) U.S. Cl.
CPC ............ *G01J 3/0272* (2013.01); *G01N 21/31* (2013.01); *G01N 21/645* (2013.01); *G01N 21/78* (2013.01); *G01N 2201/0221* (2013.01)

(58) Field of Classification Search
CPC ................. G01N 21/31; G01N 21/645; G01N 2201/0221; G01J 3/0272
See application file for complete search history.

(56) References Cited

U.S. PATENT DOCUMENTS 6,477,479 B1   11/2002  Mansky et al.
7,126,685 B1 *  10/2006  Paige ................. G01N 21/0303
                                               356/427
(Continued)

FOREIGN PATENT DOCUMENTS

CN       102153575 A    8/2011
EP        0259951 A2    3/1988
(Continued)

OTHER PUBLICATIONS

Atkinson et al., "NMR and Luminescence Binding Studies of Ytterbium, Thulium, and Europium Macrocyclic Complexes with Phosphorus(V) Oxy Anions," Helvetica Chimica Acta, vol. 88, No. 3, 2005, pp. 391-405.
(Continued)

*Primary Examiner* — Maurice C Smith
(74) *Attorney, Agent, or Firm* — William R. Childs; Childs Patent Law PLLC

(57) ABSTRACT

The present disclosure relates to mobile devices for analyzing a chemical composition, and related methods of analyzing a chemical composition. A benefit of embodiments disclosed herein can include portable and economical devices providing for simple and rapid analysis of luminescent chemical sensor arrays. A benefit of methods disclosed herein can include the use of embodied devices to provide highly accurate qualitative and quantitative analyses of the components of a broad range of chemical compositions. A benefit of the methods disclosed herein can include the rapid, simple, and accurate analysis of trace chemicals present in chemical compositions.

21 Claims, 7 Drawing Sheets

Related U.S. Application Data continuation of application No. PCT/US2020/064176, filed on Dec. 10, 2020.

(60) Provisional application No. 62/949,104, filed on Dec. 17, 2019.

(51) Int. Cl.
*G01N 21/64* (2006.01)
*G01N 21/78* (2006.01)

(56) References Cited

U.S. PATENT DOCUMENTS

| | | | |
|---|---|---|---|
| 7,416,703 | B2 | 8/2008 | Murray et al. |
| 7,968,346 | B2 | 6/2011 | Reed et al. |
| 8,105,552 | B2 | 1/2012 | Xiao et al. |
| 8,409,800 | B2 | 4/2013 | Lu et al. |
| 10,429,303 | B2 | 10/2019 | Engel et al. |
| 2006/0222567 | A1 | 10/2006 | Kloepfer et al. |
| 2007/0087452 | A1 | 4/2007 | Parker et al. |
| 2007/0272758 | A1 | 11/2007 | Kulkarni et al. |
| 2008/0207461 | A1 | 8/2008 | Ermantraut et al. |
| 2008/0219891 | A1 | 9/2008 | McDevitt et al. |
| 2010/0178208 | A1 | 7/2010 | Xiao et al. |
| 2011/0201099 | A1 | 8/2011 | Anderson et al. |
| 2012/0114089 | A1 | 5/2012 | Potyrailo et al. |
| 2012/0123686 | A1 | 5/2012 | Xiang et al. |
| 2012/0283575 | A1 | 11/2012 | Rao et al. |
| 2013/0224767 | A1 | 8/2013 | Arai |
| 2014/0145169 | A1 | 5/2014 | Lee et al. |
| 2014/0240821 | A1* | 8/2014 | Ballou ............... G02B 5/0808 359/359 |
| 2014/0287514 | A1 | 9/2014 | Humphrey et al. |
| 2015/0309008 | A1 | 10/2015 | Adelman et al. |
| 2018/0246038 | A1* | 8/2018 | Hunter .............. G01N 21/8483 |
| 2018/0335390 | A1* | 11/2018 | Leung ............... G01N 21/6428 |
| 2019/0128913 | A1* | 5/2019 | Phelan .............. G01N 35/1002 |

FOREIGN PATENT DOCUMENTS

| | | |
|---|---|---|
| WO | 2007100353 A2 | 9/2007 |
| WO | 2019067822 A1 | 4/2019 |

OTHER PUBLICATIONS

Dunning, et al., A Sensor for Trace H2O Detection in D2O, Apr. 13, 2017, 2017 Elsevier Inc., Chem 2, 579-589.

Extended European Search Report for European Patent Application 16 793 357.1 dated Jan. 2, 2019, pp. 1-8.

Hawes, et al., "Multichannel Luminescent Lanthanide Polymers as Ratiometric Sensors for D2O", Chem 2, Apr. 13, 2017, Elsevier Inc, 459-469.

Humphrey et al., Hysteretic sorption of light gases by a porous metal-organic frameworkcontaining tris(para-carboxylated) triphenylphosphine oxide, Chem. Commun. 2008, 2891-2893.

Humphrey et al., Metal-organophosphine and metal-organophosphonium frameworks withlayered honeycomb-like structures, Dalton Trans. 2009, 2298-2305.

Ibarra et al. "Gas sorption and luminescence properties of a terbium(III)-phosphine oxide coordination material withtwo-dimensional pore topology" Dalton Trans., 2012, 41, 8003 (Year: 2012).

Ibarra et al. "Molecular sensing and discrimination by a luminescent terbium-phosphine oxide coordination material" Chem.Commun., 2013, 49, 7156 (Year: 2013).

Ibarra et al. "Organic Vapor Sorption in a High Surface Area Dysprosium(III)-Phosphine Oxide Coordination Material" Inorg. Chem. 2012, 51, 12242-12247 (Year: 2012).

International Searching Authority/US, "International Search Report and Written Opinion for PCT/US2020/64176"; dated Apr. 6, 2021, 11 pages.

ISA/US, International Search Report/Written Opinion for PCT/US2020/064087, dated Mar. 3, 2021, 11 pages.

JPO, Notice of Rejection for application No. JP2017-556689 dated Apr. 14, 2020, 21 pages.

Kotek et al., Lanthanide(iii) Complexes of Novel Mixed Carboxylic-Phosphorous Acid Derivatives of Diethylenetriamine: A Step towards More Efficient MRI Contrast Agents. Chem. Eur. J 2003, 9, 5899-5915.

Luo et al. "A Facile Strategy for the Construction of Purely Organic Optical Sensors Capable of Distinguishing D2O from H2O", Angew. Chem. 2019, 131, 6346-6350.

Office Action for Chinese Application No. 201680027678.6, Issued by the National Intellectual Property Association ofthe People's Republic of China dated Jun. 11, 2020, 10 pages.

Office Action for Chinese Application No. 201680027678.6, Issued by the National Intellectual Property Association ofthe People's Republic of China dated Dec. 10, 2019, 9 pages.

Response to Office Action for Chinese Application No. 201680027678.6, Filed on Apr. 10, 2020.

Ultraviolet', Wikipedia, Oct. 29, 2013. [retrieved from the internet on Feb. 3, 2021 at para 1.

Waggoner et al. "Magnetism of Linear [Ln3]9+ Oxo-Bridged Clusters (Ln = Pr, Nd) Supported inside a [R3PR']+ PhosphoniumCoordination Material" Inorg. Chem. 2014, 53, 12674-12676.

Wikipedia—Ultraviolet retrieved from internet Feb. 3, 2021 at https://en.wikipedia.org/wiki/ultraviolet, 30 pages.

Written Opinion ofthe International Searching Authority for International Application No. PCT/US2016/031593 dated Oct. 17, 2016, pp. 1-6.

Zhan et al., "A Luminescent Mixed-Lanthanide-Organic Framework Sensor for Decoding Different Volatile OrganicMolecules," Analytical Chemistry, vol. 86, 2014, pp. 6648-6653.

\* cited by examiner

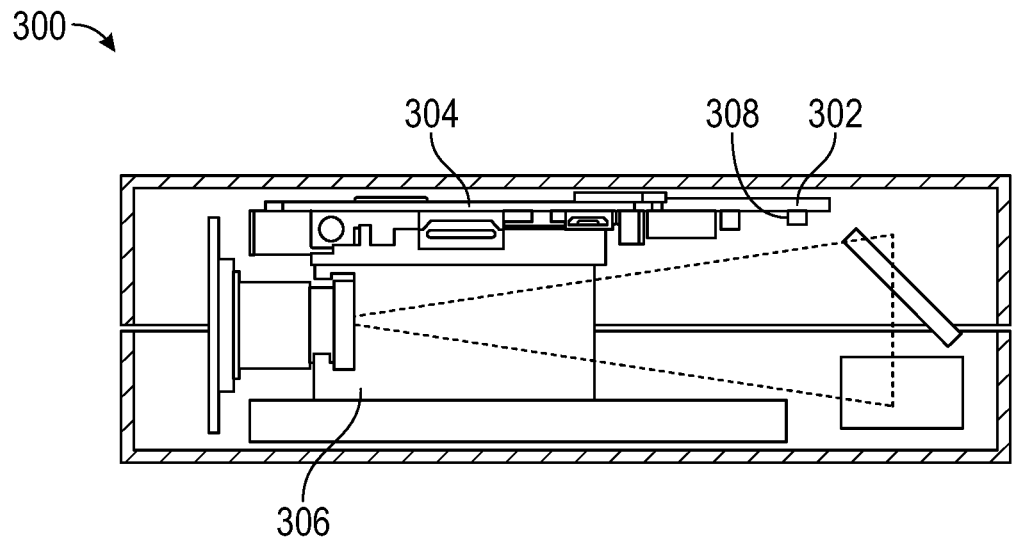
Figure 3A
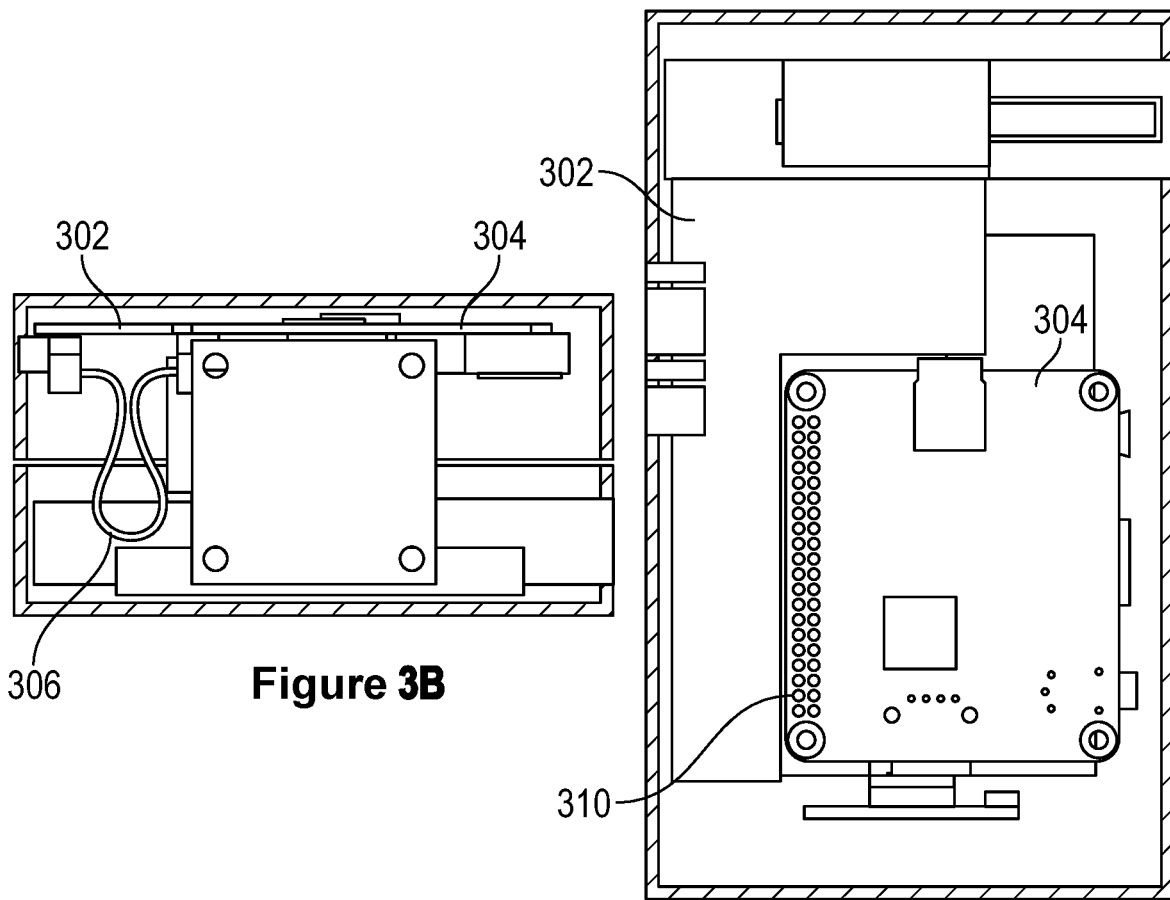
Figure 3B
Figure 3C

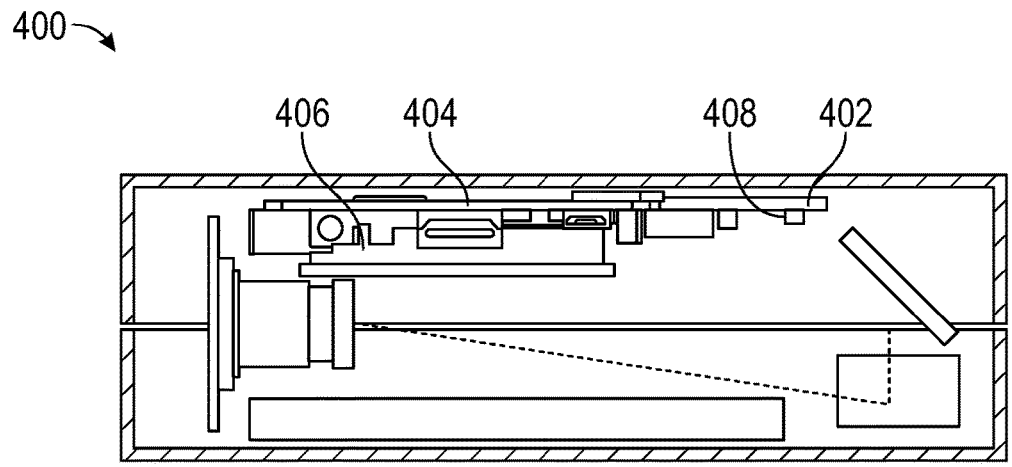
Figure 4A
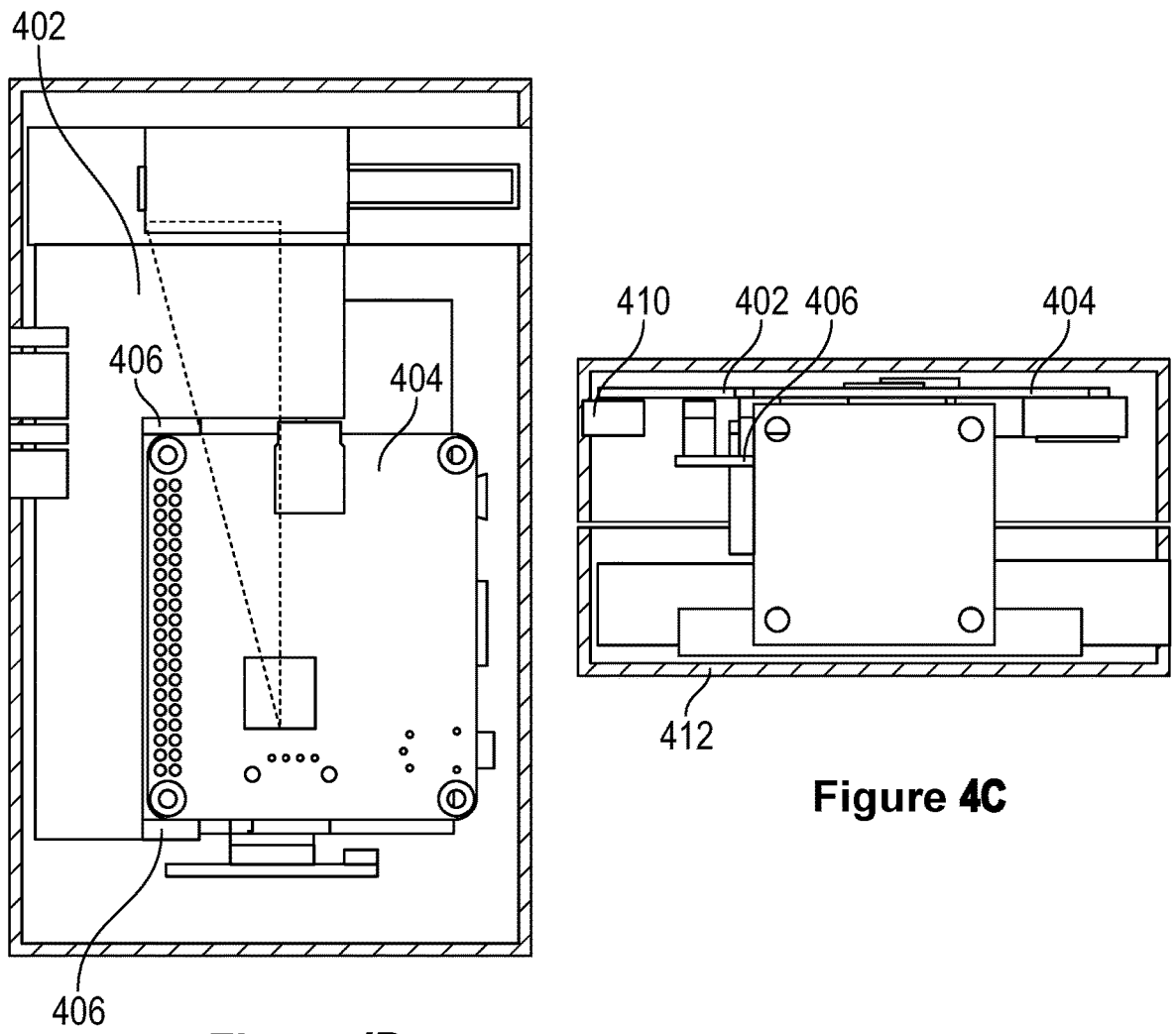
Figure 4B
Figure 4C

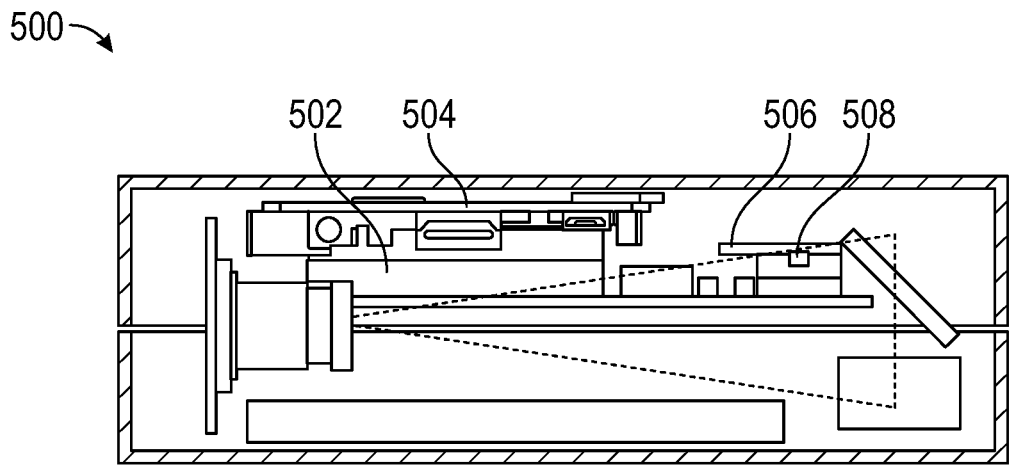
Figure 5A
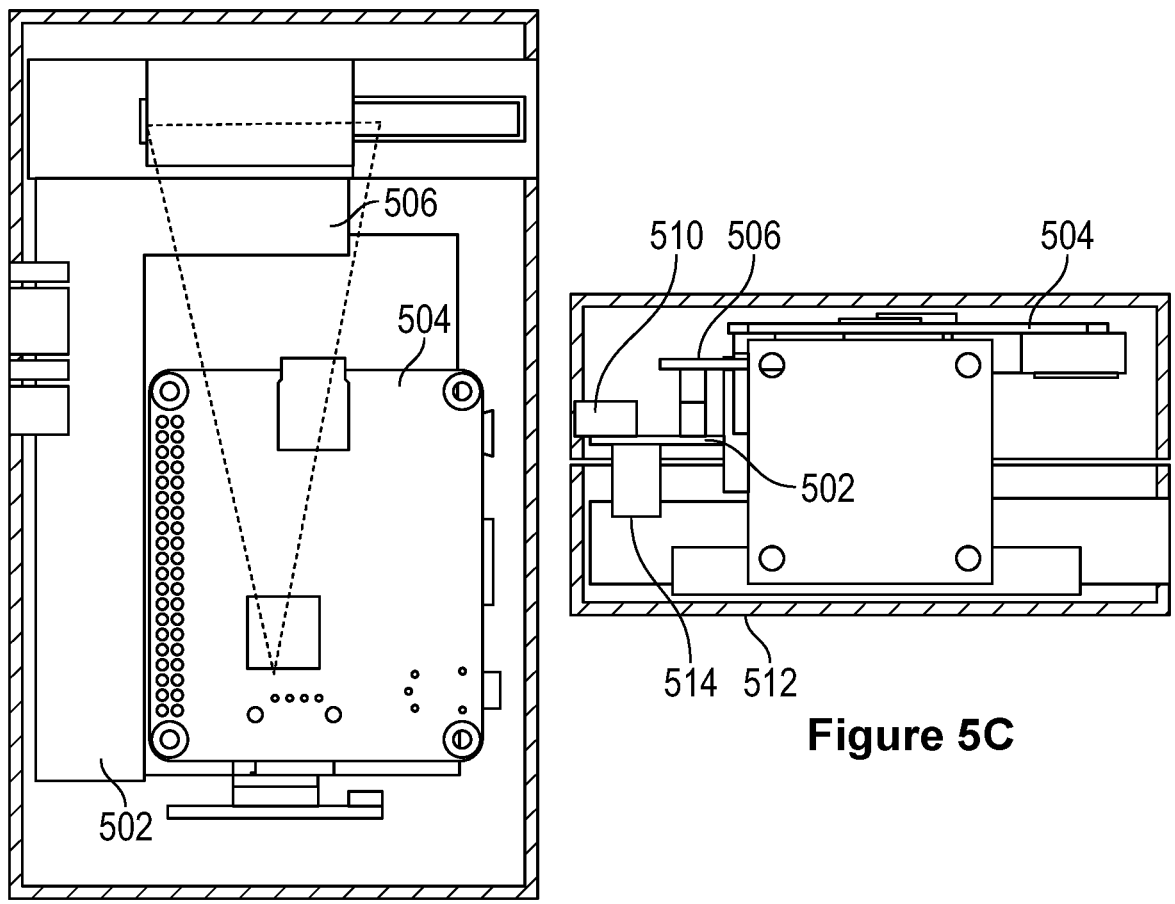
Figure 5B
Figure 5C

MOBILE DEVICES FOR CHEMICAL ANALYSIS AND RELATED METHODS

CROSS REFERENCE TO RELATED APPLICATIONS

The present application is a Continuation Application, claiming priority to U.S. patent application Ser. No. 17/228,549, filed Apr. 12, 2021, which claims priority to PCT/US20/64176, filed Dec. 10, 2020, which claims priority to U.S. Provisional Patent Application No. 62/949,104, filed Dec. 17, 2019, the disclosures of which are incorporated herein by reference in their entirety.

TECHNICAL FIELD

The present disclosure relates to mobile devices for analyzing a chemical composition, and related methods of analyzing a chemical composition. A benefit of embodiments disclosed herein can include portable and economical devices providing for simple and rapid analysis of luminescent chemical sensor arrays. A benefit of methods disclosed herein can include the use of embodied devices to provide highly accurate qualitative and quantitative analyses of the components of a broad range of chemical compositions. A benefit of the methods disclosed herein can include the rapid, simple, and accurate analysis of trace chemicals present in chemical compositions.

BACKGROUND

Analysis of the identity and concentrations of various components in chemical compositions is of central importance to many industries. However, conventional methods of analyzing chemical compositions usually require taking samples on-site, transporting the samples to a remote testing facility, and using large, expensive equipment operated by highly trained, expensive personnel to provide test results from hours to months after those samples were taken. Also, there generally is no one universal test for chemical impurities in a composition. Instead, various separate tests usually need to be performed, depending on the analyte being tested for and the concentration of that analyte in the bulk material. There remains a need for real-time, on-site analysis of chemical compositions. There remains a need for compact, portable, inexpensive devices for performing chemical analytical techniques that can test for a wide variety of impurities. There remains a need for devices that can provide rapid and accurate chemical analysis results using methods that can be quickly and easily performed by a field worker having from 5 minutes to 2 hours of training.

SUMMARY

The present disclosure relates to mobile chemical sensor devices. In various embodiments, such a mobile chemical sensor device includes a housing including a cartridge opening. In various embodiments, the mobile chemical sensor device includes a cartridge configured to position at least one chemical sensor probe having a sensor-bearing surface that includes an array of luminescent chemical sensors, wherein the cartridge forms a light sealed enclosure in an interior of the housing when the cartridge is inserted in the cartridge opening. In various embodiments, the mobile chemical sensor device includes at least one light source configured to direct light onto the sensor-bearing surface of the at least one chemical sensor probe at an angle of incidence, wherein the light source is capable of emitting light having a wavelength of from about 280 nm to about 400 nm. Various embodiments also include a camera module mounted in the light sealed enclosure and configured to detect emitted light from the at least one chemical sensor probe.

In certain embodiments, the mobile chemical sensor device further includes an optical mirror configured to reflect emitted light from the at least one chemical sensor probe to the camera module. In certain embodiments, the optical mirror includes a protective silver coating. In certain embodiments, the optical mirror is capable of reflecting from about 70% to 100% of the emitted light.

In certain embodiments, the light source includes a light emitting diode, a mercury vapor lamp, a halogen lamp, or a laser. In certain embodiments, the angle of incidence of light directed onto the sensor-bearing surface is from about 5 degrees to about 90 degrees.

In certain embodiments, the camera module includes a charged coupled device. In certain embodiments, the camera module includes a complementary metal oxide semiconductor (CMOS) image sensor. In certain embodiments, the camera module includes a camera having a micro-lens, an M12 lens, an S-Mounted lens, or a lens configured to focus light at a distance of, from about 5 cm to about 2.5 cm, including from about 10 cm to about 16 cm, from a surface of the lens. In some embodiments, the camera module includes a light transparent protective cover between a camera and the at least one chemical sensor probe.

In certain embodiments, the mobile chemical sensor device includes a battery mounted in an interior of the housing. In certain such embodiments, a battery station is mounted in an interior of the housing.

In certain embodiments, the cartridge is removable from the housing of the mobile chemical sensor device. In some embodiments, the cartridge includes at least one tray recess configured to accommodate the at least one chemical sensor probe and is configured to reversibly slide into and out of the cartridge opening along a track.

In certain embodiments, the cartridge of the mobile chemical sensor device is configured to display an area of the sensor-bearing surface of the chemical sensor probe. In some embodiments, the sensor-bearing surface has a display length of about 15 mm to about 50 mm and a display width of from about 1 mm to about 20 mm. In some embodiments, the at least one chemical sensor probe has a probe thickness of from about 0.1 mm to about 2 mm, a probe length of from about 20 mm to about 60 mm, and a probe width of from about 2 mm to about 30 mm.

In certain embodiments of the mobile chemical sensor device, the housing has a housing height of about 3 cm to about 7 cm, a housing width of from about 7 cm to about 11 cm, and a housing length of from about 10 cm to about 20 cm. In certain embodiments, the mobile chemical sensor device has a weight of from about 45 grams to about 12,000 grams.

In certain embodiments, a tag reader sensor is mounted in an interior of the housing of the mobile chemical sensor device; in some such embodiments, the tag reader sensor is configured to read an optical tag or a radio frequency identification (RFID) tag located on one or more of the chemical sensor probes.

In certain embodiments, at least one of the cartridge and the housing include a gas intake and a gas exhaust, wherein the gas intake and the gas exhaust are configured to allow a sample gas to flow across the sensor-bearing surface of the at least one chemical sensor. In some embodiments, at least one of the housing and the light sealed enclosure include a gas intake and a gas exhaust, wherein the gas intake and the gas exhaust are configured to allow a sample gas to flow across the sensor-bearing surface of the at least one chemical sensor probe.

In certain embodiments, the mobile chemical sensor device includes a single-board computer or a multi-board computer mounted in the light sealed enclosure. In certain embodiments, the mobile chemical sensor includes a printed circuit board assembly (PCBA) mounted in the light sealed enclosure and connected to the single-board computer or multi-board computer. In certain embodiments, the PCBA and the single-board computer are connected by a pin connector or a cable assembly. In certain embodiments, the PCBA is connected to the single-board computer by an adapter board. In certain embodiments, the PCBA is directly connected to the single-board computer. In certain embodiments, the light source is mounted on the PCBA. In certain embodiments, a cartridge detection sensor is mounted to the PCBA.

In certain embodiments, a light source board is mounted in an adjustable position on the PCBA, wherein the at least one light source is mounted on the light source board, and wherein the light source board is configured to adjust the angle of incidence between the at least one light source and the sensor-bearing surface of the chemical sensor probe.

In certain embodiments, the mobile chemical sensor device includes at least one communication link between a single-board computer or multi-board computer and at least one user interface. In certain embodiments, the at least one communication link includes a short-range wireless connection, a Universal Serial Bus (USB) connection, a memory card connection, or a combination thereof. In certain embodiments, the at least one user interface includes a mobile device having an operating system capable of running downloaded applications, a mobile phone, a computer, or a combination thereof. In certain embodiments, the housing includes an external USB port, an external memory card connector, an external shutter button, an external short-range wireless connector, an external power switch, or a combination thereof.

In certain embodiments, the mobile chemical sensor device is operated by a computer readable code included in the single-board or the multi-board computer, and the computer readable code is configured to receive and process at least one digital signal from the camera module. In certain embodiments, the at least one digital signal includes a plurality of RGB values derived from the emitted light from the at least one chemical sensor probe, a plurality of XYZ values derived from the plurality of RGB values, a plurality of xy values derived from the plurality of XYZ values, a data packet including one or more of a time, a date, a user name, a test name, a sample name; or combinations thereof. In certain embodiments, the at least one digital signal includes an image file.

In certain embodiments, the computer readable code includes a mandatory sequence of test protocol steps including at least one of a baseline reading step, a control reading step, and a sample reading step.

The present disclosure relates to methods of analyzing a chemical composition. In various embodiments, the method includes providing a mobile chemical sensor device and a chemical sensor probe, wherein the chemical sensor probe includes an array of luminescent chemical sensors on a sensor-bearing surface; contacting the chemical sensor probe with a chemical composition for a test duration; inserting a cartridge holding the chemical sensor probe into the mobile chemical sensor device; exposing the chemical sensor probe to a test range of light; and detecting a color and an intensity of luminescence of the array of luminescent chemical sensors. In such embodiments, the mobile chemical sensor device includes a housing including a cartridge opening configured to position the cartridge holding the chemical sensor probe, wherein the cartridge forms a light sealed enclosure in an interior of the housing when the cartridge is inserted in the cartridge opening; at least one light source configured to direct light onto the sensor-bearing surface of the chemical sensor probe at an angle of incidence, wherein the light source is capable of emitting light having a wavelength of from about 280 nm to about 400 nm; and a camera module mounted in the light sealed enclosure and configured to detect emitted light from the chemical sensor probe.

In certain embodiments, provided there is at least one chemical substance in the chemical composition, the method further includes identifying the at least one chemical substance in the chemical composition by measuring the color and the intensity of luminescence of the array of luminescent chemical sensors. In certain embodiments, provided there is at least one chemical substance in the chemical composition, the method includes measuring a concentration of a chemical substance in the chemical composition by measuring the color and the intensity of luminescence of the array of luminescent chemical sensors.

In certain embodiments, the method further includes pre-scanning the array of luminescent chemical sensors in a baseline reading step prior to contacting the chemical sensor probe with the chemical composition for the test duration. In certain embodiments, the method further includes measuring a concentration of at least one chemical substance in the chemical composition by comparing a ratio of wavelengths of luminescence emitted by a test sample to wavelengths of luminescence emitted by a concentration standard.

In certain embodiments, the method further includes identifying an identification code of the chemical sensor probe by scanning an optical tag or a radio frequency tag mounted on the chemical sensor probe; matching the identification code to an eligible identification code in a database; measuring emitted light from the array of luminescent chemical sensors in a baseline reading step, providing baseline data from the chemical sensor probe and forming a pre-scanned chemical sensor probe; identifying the identification code of the pre-scanned chemical sensor probe by scanning the optical tag or the radio frequency tag mounted on the pre-scanned chemical sensor probe; matching the identification code to an eligible identification code of a pre-scanned chemical sensor probe in the database; and measuring emitted light from the array of luminescent chemical sensors in a test reading step, providing test data from the pre-scanned chemical sensor probe.

In certain embodiments, the method further includes identifying an identification code of the chemical sensor probe by scanning an optical tag or a radio frequency tag mounted on the chemical sensor probe; matching the identification code to an ineligible code in a database; and
  sending an error signal.

BRIEF DESCRIPTION OF THE DRAWINGS

FIG. 3A shows a schematic cutaway side view of a mobile chemical sensor device according to some embodiments herein.

FIG. 3B shows a schematic cutaway end view of the mobile chemical sensor device of FIG. 3A according to some embodiments herein.

FIG. 3C shows a schematic cutaway top view of the mobile chemical sensor device of FIG. 3A and FIG. 3B according to some embodiments herein.

FIG. 4A shows a schematic cutaway side view of a mobile chemical sensor device according to some embodiments herein.

FIG. 4B shows a schematic cutaway top view of the mobile chemical sensor device of FIG. 4A according to some embodiments herein.

FIG. 4C shows a schematic cutaway end view of the mobile chemical sensor device of FIG. 4A and FIG. 4B according to some embodiments herein.

FIG. 5A shows a schematic cutaway side view of a mobile chemical sensor device according to some embodiments herein.

FIG. 5B shows a schematic cutaway top view of the mobile chemical sensor device of FIG. 5A according to some embodiments herein.

FIG. 5C shows a schematic cutaway end view of the mobile chemical sensor device of FIG. 5A and FIG. 5B according to some embodiments herein.

Figure 1A:
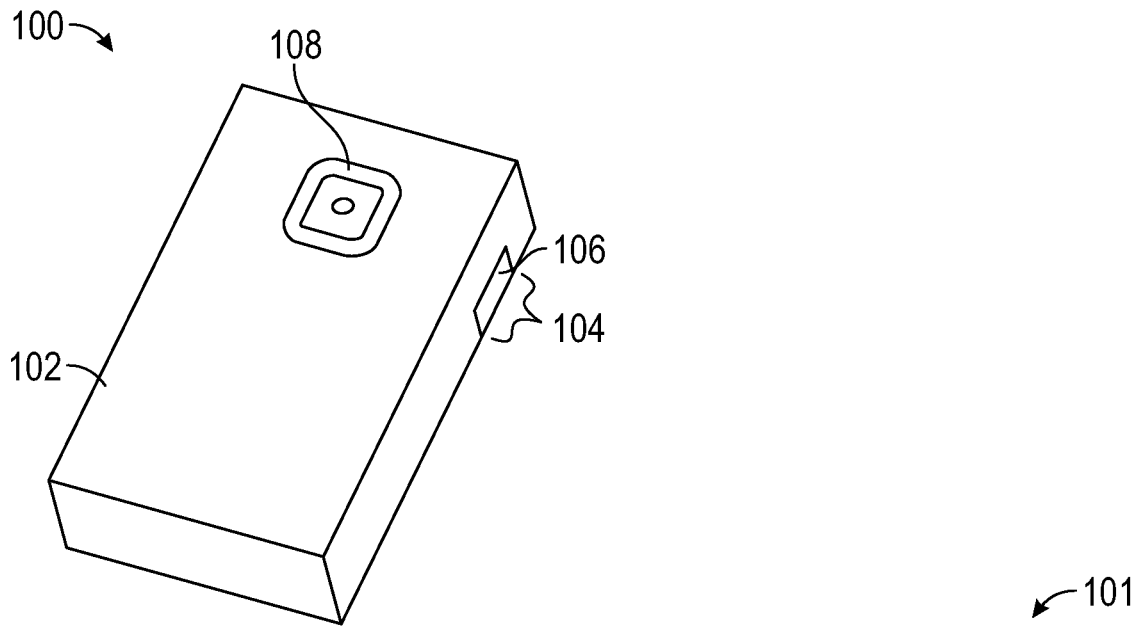
FIG. 1A shows a schematic illustration of a top and side view of a mobile chemical sensor device in a closed configuration according to some embodiments herein.

The foregoing summary, as well as the following detailed description of the embodiments, will be better understood when read in conjunction with the attached drawings. For the purpose: of illustration, there are shown in the drawings some embodiments, which may be preferable. It should be understood that the embodiments depicted are not limited to the precise details shown. Unless otherwise noted, the drawings are not to scale.

DETAILED DESCRIPTION

Unless otherwise noted, all measurements are in standard metric units.

Unless otherwise noted, all instances of the words "a," "an," or "the" can refer to one or more than one of the word or object that they modify.

Unless otherwise noted, the phrase "at least one of" means one or more than one of an object. For example, "at least one of a baseline reading step, a control reading step, and a sample reading step" means one baseline reading step, more than one baseline reading step, one control reading step, more than one control reading step, one sample reading step, more than one sample reading step, or any combination thereof.

Unless otherwise noted, the term "about" refers to ±10% of the non-percentage number that is described, rounded to the nearest whole integer. For example, about 280 mm, would include 252 to 308 mm. Unless otherwise noted, the term "about" refers to ±5% of a percentage number. For example, about 70% would include 65 to 75%. When the term "about" is discussed in terms of a range, then the term refers to the appropriate amount less than the lower limit and more than the upper limit. For example, from about 15 mm to about 50 mm would include from 13.5 to 55 mm.

Unless otherwise noted, properties (height, width, length, ratio etc.) as described herein are understood to be averaged measurements.

Unless otherwise noted, the term "mobile" refers to an object having dimensions shorter than 40 cm and a weight of less than 15,000 g. A "mobile" device as used herein refers to the portability of the device and may or may not have the ability to send and receive remote signals, such as satellite signals or cellphone signals.

Unless otherwise noted, the term "cartridge" refers to a holding component that is configured to hold at least one chemical sensor probe and configured to be insertable into the mobile device. For example, a cartridge can include a sliding tray configured to hold at least one chemical sensor probe and the cartridge can be slid into a cartridge opening of a housing of a mobile chemical sensor device to position the at least one chemical probe inside the device for analysis.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

Analysis of the identity and concentration of chemicals and components of chemical mixtures have broad applications across many industries and regulatory agencies. Just a few of these include environmental regulations, energy production, oil and gas, pharmaceuticals, chemical manufacturing, food production, hydrology, and geochemistry. Various chemical tests are important for detecting impurities and trace amounts of chemicals present in chemical mixtures. Among the myriad types of tests, some of these include performing quality assurance evaluations of chemical batch quality, testing deuterium oxide refinement, monitoring thug manufacturing processes, providing laboratory services to test land and water for contaminants, quality control testing of wholesale chemicals, monitoring environmental conditions, testing fuel integrity, analyzing chemical isotopes, and tracking moisture levels. Environmental monitoring is important for satisfying regulatory requirements and maintaining the safety of water supplies, including the monitoring of oil and gas wastewater from fracking operations, testing of reclaimed water, and testing of potable water quality. Fuel integrity is maintained by testing of high purity fuels for common contaminants, such as diesel exhaust fluid (DEF) in aviation fuel. Dangerous chemicals in the environment can be identified, such as explosives and explosive taggants, and chemical warfare agent byproducts such as fluoride and cyanide.

Traditional methods of chemical analysis are generally time consuming and expensive. For the analysis of chemicals by traditional methods, samples often must be collected in sample containers and then packaged for transport, which can add days or weeks to the process. Large sample volumes may be required, adding to the difficulty of sample collection and transport. The samples must then be analyzed and a report generated, which may require the input of highly trained laboratory staff and the use of expensive equipment located in a distant laboratory. The types of complex analyses performed can include Fourier-transform infrared spectroscopy (FT-IR) or nuclear magnetic resonance measurements (NMR), complex spectrophotometry (UV-Vis), or variations of mass spectroscopy (e.g. time of flight mass spectroscopy). Such analyses are difficult, expensive, and time-consuming to perform. High costs can also be involved just for setting up the test facility and equipment. Overall, the process can take anywhere from several days up to several weeks to complete and can cost hundreds to millions of dollars. And those costs may only include the equipment. The time and costs of recruiting, training, and retaining highly skilled workers to interpret the test results can double or triple the cost. At the same time, new regulatory standards are causing companies to seek more chemical testing, which has been proving to be prohibitively expensive.

Embodiments disclosed herein can address the challenges presented by current chemical analysis technology, by allowing previously difficult, time consuming, and expensive chemical tests to be performed quickly and easily in the field, and at a fraction of the cost of traditional analyses. Mobile chemical sensor devices according to embodiments herein can provide a benefit of rapid, low-cost, point-of-use chemical detection and measurement. The mobile chemical sensor devices disclosed herein can provide a benefit of portable, lightweight, durable devices for performing chemical analyses on site.

Use of the disclosed mobile chemical sensor devices in chemical analysis methods embodied herein can provide a benefit of allowing the highly accurate testing of a broad variety of chemicals by using chemical sensor probes with the mobile chemical sensor devices. It has been discovered that certain phosphorous-based photoluminescent compounds exhibit changes in their relative luminescence emission intensity and wavelength when exposed to chemical solvents or impurities in chemical compositions. It has been discovered that such compounds can serve as sensors for the identification and quantitative detection of a wide variety of solvents including liquids, gases, and solids. The present disclosure can provide a benefit of mobile, mobile chemical sensor devices capable of reading or analyzing chemical sensor probes that incorporate such sensors, to harness their broad sensitivity and specificity in a compact, portable, inexpensive, easy to use format that can quickly and easily identify and quantify a large number of components present in chemical mixtures with minimal sample volumes, all in a single test. Such mobile chemical sensor devices can analyze chemical sensor probes to provide enormous advantages in terms of time and money savings over traditional chemical analysis methods.

Such embodiments of mobile chemical sensor devices can provide a user friendly, rapid, simple and inexpensive way to identify trace chemicals present in chemical mixtures. Such embodiments of mobile chemical sensor devices can provide the benefits of quantitative accurate results down to concentrations of 10 ppm in as little as 1-2 minutes, with customizable options that can be tailored for specific applications, and costs of just a few dollars per test. Such embodiments of mobile chemical sensor devices can provide an advantage of simplicity such that the methods herein can be easily performed by staff having 5 minutes to 2 hours of training. With such advantages, there is no need for expensive and time-consuming sample collection, transport, and analysis by expensive personnel and lab equipment.

Figure 1B:
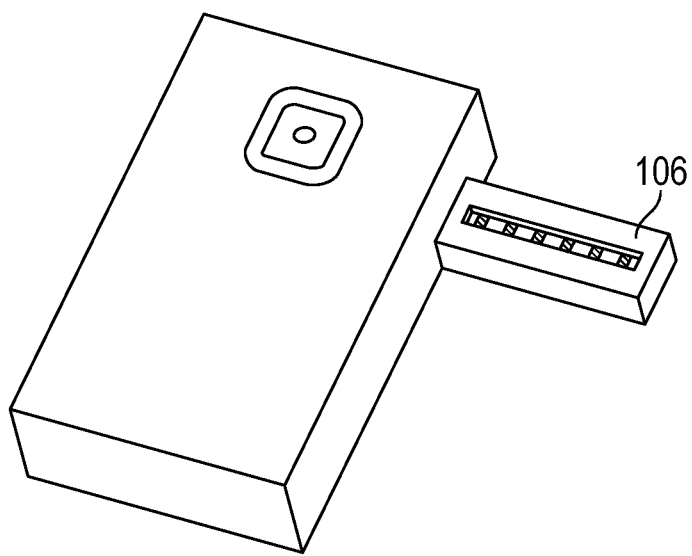
FIG. 1B shows a schematic illustration of a top and side view of the mobile chemical sensor device in FIG. 1A in an open configuration according to some embodiments herein.
Figure 1C:
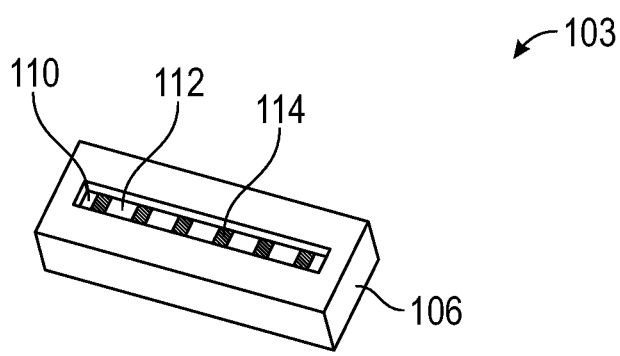
FIG. 1C shows a magnified view of the mobile device of FIG. 1B having a sample loaded in a chemical senor probe in a cartridge according to some embodiments herein.

The present disclosure relates to chemical sensor devices for analyzing a chemical composition. As an illustration of a chemical sensor device according to some embodiments herein, referring to the top and side view in FIG. 1A, chemical sensor device 100 in a closed configuration includes a housing 102 including a cartridge opening 104 with a cartridge 106 inserted into the cartridge opening, and shutter button 108 on an exterior of the housing. Referring to the top and side view in FIG. 1B, includes chemical sensor device 101 includes cartridge 106 in an open configuration. Referring to the magnified view in FIG. 1C, the mobile chemical sensor device 103 includes a chemical sensor probe 110 is positioned in a cartridge 106, the chemical sensor probe having a sensor-bearing surface 112 including an array of luminescent chemical sensors 114.

Figure 2A:
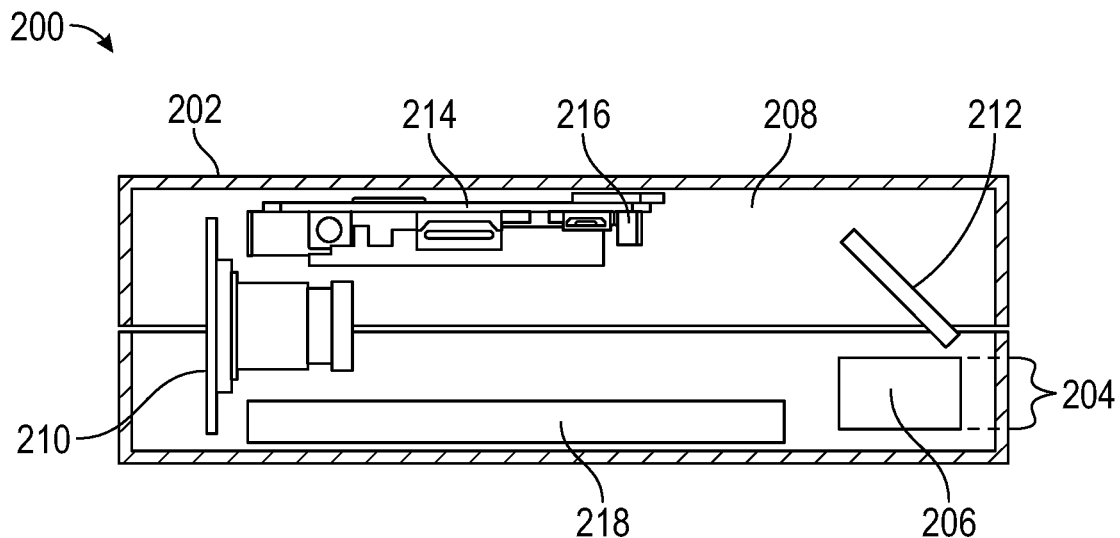
FIG. 2A shows a schematic cutaway side view of a mobile chemical sensor device according to some embodiments herein.
Figure 2B:
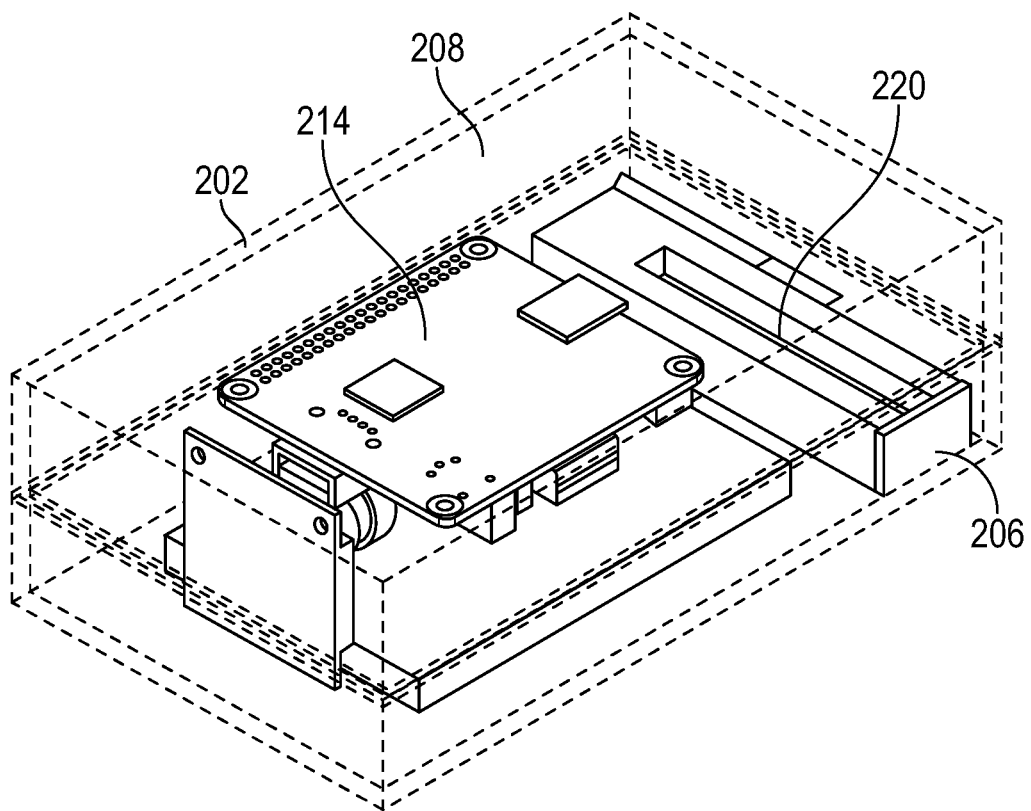
FIG. 2B shows a schematic cutaway top and side view of the mobile chemical sensor device of FIG. 2A according to some embodiments herein.

As an illustration of a chemical sensor device according to some embodiments, referring to the cutaway side view of FIG. 2A, chemical sensor device 200 includes housing 202 including cartridge opening 204 and cartridge 206 configured to form light sealed enclosure 208 in an interior of housing 202 when cartridge 206 is inserted into cartridge opening 204; camera module 210, optical mirror 212, single-board computer 214, and light source 216 mounted in light sealed enclosure 208; and battery 218 mounted in an interior of housing 202. Referring to the cutaway top and side view of FIG. 2B, housing 202 includes single-board computer 214 mounted in light-sealed enclosure 208, and chemical sensor probe 220 positioned in cartridge 206.

As an illustration of a chemical sensor device according to some embodiments, referring to the cutaway side view of FIG. 3A, chemical sensor device 300 includes printed circuit board assembly (PCBA) 302 connected to single-board computer 304 by cable assembly 306, and one or more light emitting diodes 308 mounted on PCBA 302. Referring to the cutaway end view of FIG. 3B, PCBA 302 and single-board computer 304 are connected by cable assembly 306. Referring to the schematic cutaway top view of an alternative embodiment of the mobile chemical sensor device of FIG. 3C according to some embodiments herein, PCBA 302 and single-board computer 304 are connected by pin connector 310.

As an illustration of a chemical sensor device according to some embodiments herein, referring to the cutaway side view of FIG. 4A, chemical sensor device 400 includes printed circuit board assembly (PCBA) 402 connected to single-board computer 404 by adapter board 406, and one or more light emitting diodes 408 mounted on PCBA 402. Referring to the cutaway top view of FIG. 4B, adapter board 406 connects single-board computer 404 to PCBA 402. Referring to the schematic cutaway end view of FIG. 4C, PCBA 402 and single-board computer 404 are connected by adapter board 406, and USB port 410 is located near a top surface of housing 412.

As an illustration of a chemical sensor device according to some embodiments herein, referring to the cutaway side view of FIG. 5A, chemical sensor device 500 includes PCBA 502 directly connected to single-board computer 504, light source board 506 mounted in an adjustable position on PCBA 502, and at least one light source 508 mounted on light source board 506. Referring to the cutaway top view in FIG. 5B, PCBA 502 is directly connected to single-board computer 504, and light source board 506 is mounted in an adjustable position on PCBA 502. Referring to the cutaway end view of FIG. 5C, PCBA 502 is directly connected to single-board computer 504, light source board 506 is mounted in an adjustable position on PCBA 502, USB port 510 is located away from a top surface of housing 512, and cartridge detection sensor 514 is mounted to PCBA 502.

Figure 6:
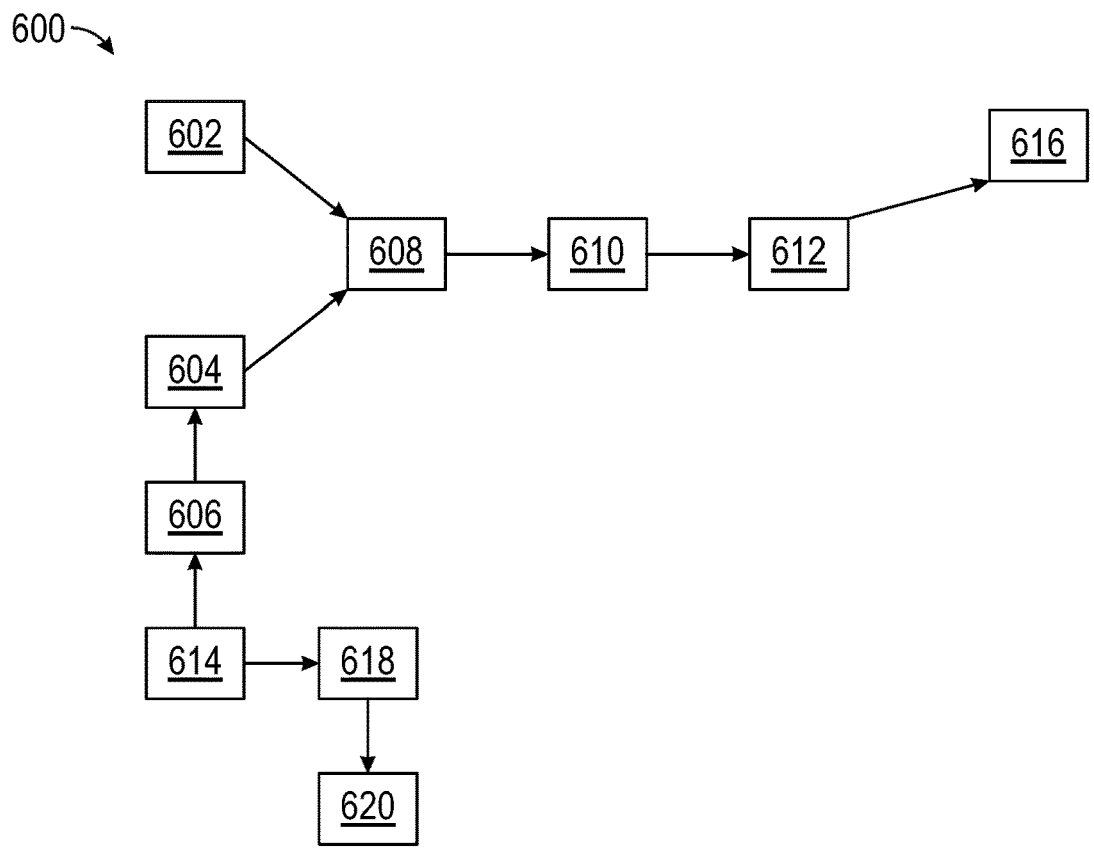
FIG. 6 shows a flow chart depicting a method of analyzing a chemical composition using a mobile chemical sensor device according to some embodiments herein.

The present disclosure relates to methods of analyzing a chemical composition. As a general overview of a method according to some embodiments herein, referring to the flow chart in FIG. 6, the method 600 includes providing a mobile chemical sensor device 602 and providing a chemical sensor probe 604, the chemical sensor probe including an array of luminescent chemical sensors on a sensor-bearing surface; contacting the chemical sensor probe with a chemical composition for a test duration 606; inserting a cartridge holding the chemical sensor probe into the mobile chemical sensor device 608; exposing the chemical sensor probe to a test range of light 610; and detecting a color and an intensity of luminescence of the array of luminescent chemical sensors 612. In an embodiment, the method can include 614 pre-scanning the array of luminescent chemical sensors in a baseline reading step prior to contacting the chemical sensor probe with the chemical composition for the test duration. In an embodiment, 616 the method can further include steps including measuring a concentration of at least one chemical substance in the chemical composition by comparing a ratio of wavelengths of luminescence emitted by a test sample to wavelengths of luminescence emitted by a concentration standard. In an embodiment, the method can further include 618 identifying an identification code of the chemical sensor probe by scanning an optical tag or a radio frequency tag mounted on the chemical sensor probe; matching the identification code to an ineligible code in a database; and sending an error signal 620.

The present disclosure relates to computer systems for use in methods of analyzing a chemical composition. As an illustration of a computer system according to some embodiments herein, referring to the schematic diagram in FIG. 7, computer system 701 includes a central processing unit 705, memory or memory location 710, electronic storage unit 715, communication interface 720, and peripheral devices 725. The memory 710, storage unit 715, interface 720 and peripheral devices 725 are in communication with the CPU 705 through a communication bus (solid lines). Computer system 701 is operatively coupled to computer network 730 with the aid of communication link 720. Computer system 701 includes or is in communication with electronic display 735 that includes user interface (UI) 740.

Figure 8:
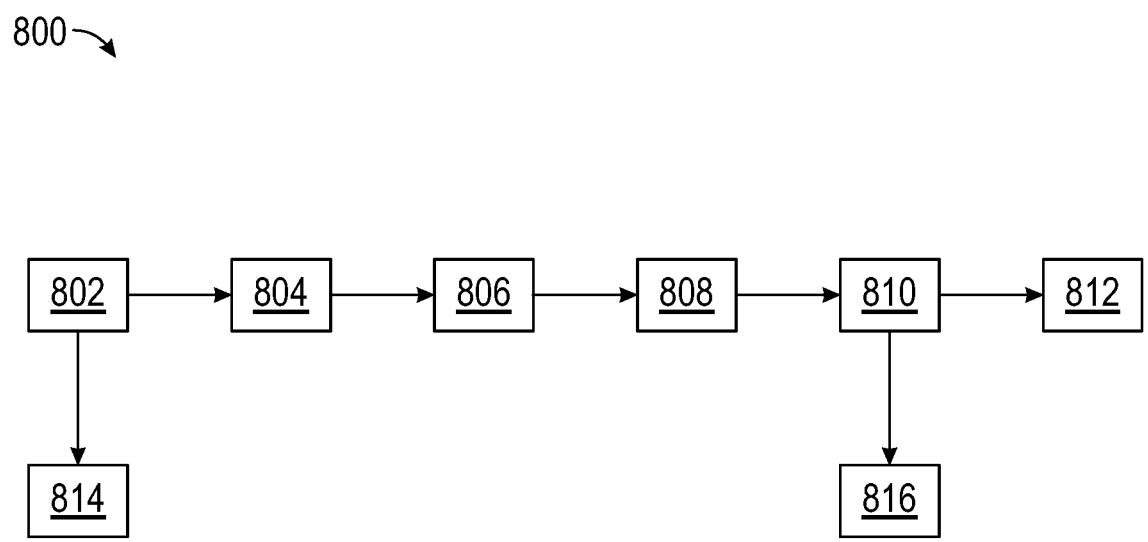
FIG. 8 shows a flow chart depicting a method of analyzing or rejecting chemical samples using a mobile chemical sensor device according to some embodiments herein.

The present disclosure relates to methods of analyzing a chemical composition. As a general overview of a method according to some embodiments herein, referring to the flow chart in FIG. 8, the method 800 includes identifying an identification code of a chemical sensor probe by scanning an optical tag or a radio frequency tag mounted on the chemical sensor probe 802; matching the identification code to an eligible identification code in a database 804; measuring emitted light from the array of luminescent chemical sensors in the chemical sensor probe in a baseline reading step, providing baseline data from the chemical sensor probe and forming a pre-scanned chemical sensor probe 806; identifying the identification code of the pre-scanned chemical sensor probe by scanning the optical tag or the radio frequency tag 808; matching the identification code to an eligible identification code of a pre-scanned chemical sensor probe in the database 810; and measuring emitted light from the array of luminescent chemical sensors in a test reading step 812, providing test data from the pre-scanned chemical sensor probe. Alternatively, method 800 includes identifying an identification code of the chemical sensor probe by scanning an optical tag or a radio frequency 802; matching the identification code to an ineligible code in a database and sending an error signal 814; or matching the identification code to an ineligible code in a database and sending an error signal 816. A benefit of this design can be that there are 2 places error codes prevent erroneous measurements. Firstly, an error code 814 would be received when attempting to pre-scan a probe previously used to prevent or reduce the chance of using a probe contaminated from a previous measurement. In an embodiment, the system and/or method would prevent further processing until an eligible probe is inserted. Secondly, an error code 816 would be received when trying to analyze a probe for which no pre-scan was performed to prevent or reduce the chance of inferior quality measurements due to the lack of a control measurement. In an embodiment, the system and/or method would prevent further processing until a pre-scanned, and therefore, eligible probe is inserted into the device.

Embodiments of Mobile Chemical Sensor Devices

The present disclosure relates to mobile chemical sensor devices. In various embodiments, a mobile chemical sensor device includes a housing, wherein the housing includes a cartridge opening. In various embodiments, the mobile chemical sensor device includes a cartridge configured to position at least one chemical sensor probe, the chemical sensor probe having a sensor-bearing surface that includes an array of luminescent chemical sensors. In various embodiments, the cartridge forms a light sealed enclosure in an interior of the housing when the cartridge is inserted in the cartridge opening. A light sealed enclosure can provide a benefit of a light-tight or a dark environment in which to perform chemical analyses with greater accuracy, and to aid in the prevention of cross-contamination between chemical samples.

In various embodiments, the mobile chemical sensor device includes at least one light source configured to direct light onto the sensor-bearing surface of the at least one chemical sensor probe at an angle of incidence. In some embodiments, the light source is capable of emitting light having a wavelength of from about 280 nm to about 400 nm. In certain embodiments, the light source is capable of emitting light having a wavelength of from about 300 nm to about 380 nm. In certain embodiments, the light source is capable of emitting light having a wavelength of from about 320 nm to about 360 nm. In an embodiment, the device can include a light source or a second light source or a visible light source that is capable of emitting light having a wavelength of from about 400 nm to about 800 nm. In various embodiments, the mobile chemical sensor device includes a visible light source. In various embodiments, the mobile chemical sensor device includes a visible light source, that is or includes a source of white light (400 nm to 700 nm). A benefit of a visible light source can include enabling the mobile device to perform functions that are not sensitive to ultraviolet light or that can be performed by white light or visible light, such as aiding the reading or scanning of serial numbers, bar codes, or other numbers or symbols connected to a particular mobile chemical sensor device. In certain embodiments, the light source includes a light emitting diode (LED), a mercury vapor lamp, a halogen lamp, a laser, or combinations thereof. In certain embodiments, the light source includes one or more ultraviolet LEDs. In certain embodiments, the one or more UV LEDs can include a 340 nm UV LED, a 365 nm LV or a combination thereof. In certain embodiments, the angle of incidence of light directed onto the sensor-bearing surface is from about 5 degrees to about 90 degrees. In certain embodiments, the angle of incidence of light directed onto the sensor-bearing surface is from about 15 degrees to about 75 degrees. In certain embodiments, the angle of incidence of light directed onto the sensor-bearing surface is from about 30 degrees to about 60 degrees.

Various embodiments of the mobile chemical sensor device also include a camera module mounted in the light sealed enclosure and configured to detect emitted light from the at least one chemical sensor probe. In certain embodiments, the camera module includes a charged coupled device camera. In certain embodiments, the camera module includes a complementary metal oxide semiconductor (CMOS) image sensor. In certain embodiments, the camera module includes a camera having a micro-lens, an M12 lens, or an S-Mounted lens. In certain embodiments, the camera module includes a camera having a lens configured to focus light at a distance of, from about 5 cm to about 25 cm, including from about 10 cm to about 16 cm, from a surface of the lens. Such embodiments can provide a benefit of clear images taken by the camera module at a reasonable distance from the at least one chemical sensor probe, in a portable mobile chemical sensor device suitable for handheld use, and at a low cost. In some embodiments, the camera module includes a light transparent protective cover between a camera and the at least one chemical sensor probe. Such embodiments can provide benefits of keeping the camera module clean, and preventing cross-contamination between samples.

In certain embodiments, the mobile chemical sensor device further includes an optical mirror configured to reflect emitted light from the at least one chemical sensor probe to the camera module. In certain embodiments, the optical mirror includes a protective silver coating. In certain embodiments, the optical mirror is capable of reflecting from about 70% to 100% of the emitted light. In certain embodiments, the optical mirror is capable of reflecting from about 75% to about 95% of the emitted light. In certain embodiments, the optical mirror is capable of reflecting from about 80% to about 90% of the emitted light. In various embodiments, the optical mirror can be selected to provide the desired reflectivity for the range of wavelengths of the emitted light.

In certain embodiments, the mobile chemical sensor device includes a battery mounted in an interior of the housing. In certain such embodiments, a battery station is mounted in an interior of the housing. In certain embodiments, the battery can be rechargeable or non-rechargeable. In certain embodiments, the battery can be reversibly removed or permanently mounted.

In certain embodiments, the cartridge is removable from the housing of the mobile chemical sensor device. In some embodiments, at least one cartridge be reversibly removed and separated from the housing. Such embodiments can provide a benefit for easier cleaning of the cartridge. Such embodiments can also provide a benefit of an ability to switch between multiple cartridges, which may or may not have different designs, into the cartridge opening of the device. In some embodiments, the cartridge is configured to reversibly slide into and out of the cartridge opening along a track. Such embodiments can provide fewer separate components to misplace. In some embodiments, the cartridge includes at least one tray recess configured to accommodate the at least one chemical sensor probe. Such embodiments can provide a benefit of an ability to perform one or more steps of a method of chemical analysis as disclosed herein, without any need to touch the at least one chemical sensor probe. Such embodiments can also provide a benefit of stabilizing the one or more chemical sensor probe positions for proper alignment with the camera module, optical mirror, and light source of the mobile chemical sensor device. Such embodiments can also provide a benefit of making it easy to load or switch or interchange chemical sensor probes for analysis.

In certain embodiments, the cartridge of the mobile chemical sensor device is configured to display an area of the sensor-bearing surface of the chemical sensor probe. In some embodiments, the sensor-bearing surface has a display length of about 15 mm to about 50 mm. In some embodiments, the sensor-bearing surface has a display length of about 20 mm to about 45 mm. In some embodiments, the sensor-bearing surface has a display length of about 25 mm to about 40 mm. In some embodiments, the sensor-bearing surface has a display width of from about 1 mm to about 20 mm. In some embodiments, the sensor-bearing surface has a display width of from about 5 mm to about 15 mm. In some embodiments, the sensor-bearing surface has a display width of from about 8 mm to about 12 mm. In some embodiments, the at least one chemical sensor probe has a probe thickness of from about 0.1 mm to about 2 mm. In some embodiments, the at least one chemical sensor probe has a probe length of from about 20 mm to about 60 mm. In some embodiments, the at least one chemical sensor probe has a probe length of from about 25 mm to about 55 mm. In some embodiments, the at least one chemical sensor probe has a probe length of from about 35 mm to about 45 mm. In some embodiments, the at least one chemical sensor probe has a probe width of from about 2 mm to about 30 mm. In some embodiments, the at least one chemical sensor probe has a probe width of from about 7 mm to about 25 mm. In some embodiments, the at least one chemical sensor probe has a probe width of from about 15 mm to about 20 mm. Such embodiments can provide a benefit of a small chemical sensor probe size suitable for use in a portable, compact mobile chemical sensor device as disclosed herein.

In certain embodiments of the mobile chemical sensor device, the housing has a housing height of about 3 cm to about 7 cm. In certain embodiments of the mobile chemical sensor device, the housing has a housing height of about 3.5 cm to about 6.5 cm. In certain embodiments of the mobile chemical sensor device, the housing has a housing height of about 4 cm to about 6 cm. In certain embodiments, the housing has a housing width of from about 7 cm to about 11 cm. In certain embodiments, the housing has a housing width of from about 7.5 cm to about 10.5 cm. In certain embodiments, the housing has a housing width of from about 8 cm to about 10 cm. In certain embodiments, the housing has a housing length of from about 10 cm to about 20 cm. In certain embodiments, the housing has a housing length of from about 12 cm to about 18 cm. In certain embodiments, the housing has a housing length of from about 14 cm to about 16 cm. In certain embodiments, the mobile chemical sensor device has a weight of from about 45 grams to about 12,000 grams. In certain embodiments, the mobile chemical sensor device has a weight of from about 250 grams to about 7,500 grams. In certain embodiments, the mobile chemical sensor device has a weight of from about 1,000 grams to about 5,000 grams. Such embodiments can provide a benefit of a mobile chemical sensor device having a compact size and a portable weight.

In certain embodiments, a tag reader sensor is mounted in an interior of the housing of the mobile chemical sensor device. In some embodiments, the tag reader sensor is configured to read an optical tag or a radio frequency identification (RFID) tag located on one or more of the chemical sensor probes. Such embodiments can provide benefits of identifying individual chemical sensor probes, detecting whether a calibration or a sample reading has been taken for an individual chemical sensor probe, and preventing errors in sample processing.

In certain embodiments, at least one of the cartridge and the housing include a gas intake and a gas exhaust, wherein the gas intake and the gas exhaust are configured to allow a sample gas to flow across the sensor-bearing surface of the at least one chemical sensor. In some embodiments, at least one of the housing and the light sealed enclosure include a gas intake and a gas exhaust, wherein the gas intake and the gas exhaust are configured to allow a sample gas to flow across the sensor-bearing surface of the at least one chemical sensor probe. In some embodiments, the sample gas includes air.

In certain embodiments, at least one of the cartridge and the housing include a liquid intake and a liquid exhaust or liquid drain, wherein the liquid intake and the liquid exhaust are configured to allow a sample liquid to flow across the sensor-bearing surface of the at least one chemical sensor. In some embodiments, at least one of the housing and the light sealed enclosure include a liquid intake and a liquid exhaust, wherein the liquid intake and the liquid exhaust are configured to allow a sample liquid to flow across the sensor-bearing surface of the at least one chemical sensor probe.

In certain embodiments, the mobile chemical sensor device includes a single-board computer or a multi-board computer mounted in the light sealed enclosure. In some embodiments, the single-board computer can include a low cost computer having a compact size. In certain embodiments, the single-board computer can include a Raspberry Pi computer or other suitable off-the-shelf single-board computer. In certain embodiments, the mobile chemical sensor includes a printed circuit board assembly (PCBA) mounted in the light sealed enclosure and connected to the single-board computer or multi-board computer. In certain embodiments, the PCBA can include a custom PCBA configured to connect with the single-board computer in a compact mobile chemical sensor device as disclosed herein.

In certain embodiments, the PCBA and the single-board computer are connected by a pin connector or a cable assembly. In certain embodiments, the pin connector can include a 40-pin connector. In certain embodiments, the PCBA is connected to the single-board computer by an adapter board. In certain embodiments, the adapter board can include a General Purpose Input/Output (GPIO) adapter board. In certain embodiments, the PCBA is directly connected to the single-board computer. In certain embodiments, the light source is mounted on the PCBA. In certain embodiments, a cartridge detection sensor is mounted to the PCBA. Embodiments including a cartridge detection sensor can provide a benefit of detecting when a cartridge is properly inserted into the cartridge opening of the mobile chemical sensor device housing.

In certain embodiments, a light source board is mounted in an adjustable position on the PCBA. In such embodiments, the at least one light source can be mounted on the light source board, and the position of the light source board can be configured to adjust the angle of incidence between the at least one light source and the sensor-bearing surface of the chemical sensor probe. In certain embodiments, the light source board can include a UV LED board. In certain embodiments, one or more UV LEDs is mounted on the UV LED board. Embodiments including a light source board can include a benefit of adjusting the angle of incidence so as to improve the illumination of the at least one chemical sensor probe. Such embodiments can provide a benefit of versatility in positioning of the light source for improved chemical analysis accuracy. Such embodiments can also provide a benefit of an ability to replace or upgrade the light source board in the mobile chemical sensor device.

In certain embodiments, the mobile chemical sensor device includes at least one communication link between a single-board computer or multi-board computer and at least one user interface. Such embodiments can provide a benefit of versatility in chemical analysis data storage and communication when using a mobile chemical sensor device according to embodiments herein. In certain embodiments, the at least one communication link includes a short-range wireless connection, a Universal Serial Bus (USB) connection, a memory card connection, or a combination thereof. In certain embodiments, the short-range wireless connection can include a "Bluetooth" connection. Such embodiments can provide a benefit of an ability to transfer or export chemical analysis data.

In certain embodiments, the at least one user interface includes a mobile sensor device having an operating system capable of running downloaded applications, a mobile phone, a computer, or a combination thereof. Such embodiments can provide a benefit of a mobile sensor device that can communicate with a user's mobile phone, with a computer, or a combination thereof. Such embodiments can provide benefits of avoiding a technical risk of replacing a user's mobile phone, and avoiding user confusion due to unfamiliarity with a different mobile phone. In certain embodiments, the housing includes an external USB port, an external memory card connector, an external shutter button, an external short-range wireless connector, an external power switch, or a combination thereof.

In certain embodiments, the mobile chemical sensor device is operated by a computer readable code included in the single-board or the multi-board computer, and the computer readable code is configured to receive and process at least one digital signal from the camera module. In certain embodiments, the at least one digital signal includes a plurality of RGB values derived from the emitted light from the at least one chemical sensor probe, a plurality of XYZ values derived from the plurality of RGB values, a plurality of xy values derived from the plurality of XYZ values, a data packet including one or more of a time, a date, a user name, a test name, a sample name; or combinations thereof. In certain embodiments, the at least one digital signal includes an image file.

In certain embodiments, the computer readable code includes a mandatory sequence of test protocol steps including at least one of a baseline reading step, a control reading step, and a sample reading step. Such embodiments can provide a benefit of avoiding user error; for example, attempting to read a sample without having first performed a calibration step on the chemical sensor probe, or attempting to take a second sample reading on a "used" chemical sensor probe. Such embodiments can provide benefits of a mobile chemical sensor device that is simple to use, that is resistant to user error, and that can be easily used effectively by field staff with from minutes to 2 hours of training.

Chemical Sensor Probes of Various Embodiments

The present disclosure relates to chemical sensor probes for analyzing a chemical composition. In various embodiments, a chemical sensor probe includes a sensor-bearing surface, wherein the sensor-bearing surface includes an array of luminescent chemical sensors. In such embodiments, the array of luminescent chemical sensors can include at least one control sensor and at least one detection sensor. In such embodiments, the at least one control sensor can include a control lanthanide containing phosphorous compound mounted onto a control area of a control platform, and the at least one detection sensor can include a combination of two or more detection lanthanide containing phosphorous compounds mounted onto a detection area of a detection platform. In certain embodiments, the control platform and the detection platform are adhered to a sensor bearing surface.

In certain embodiments, the array of luminescent chemical sensors includes from 1 to 3 control sensors and from 1 to 6 detection sensors. In other embodiments, the array of luminescent chemical sensors includes 2 control sensors and from 1 to 50 detection sensors.

In certain embodiments, the control platform and the detection platform include a fibrous material. In certain embodiments, the control platform and the detection platform are mounted on separate fibrous materials. In certain embodiments, the fibrous material includes a cellulosic material, a paper material, a silicone paper material, or a combination thereof. Considering the high sensitivity and reactivity of the lanthanide containing phosphorous compounds for a wide variety of chemical compounds, the present disclosure of a control platform and a detection platform mounted on separate fibrous materials can provide a benefit of preventing cross-contamination between the control sensors and the detection sensors. Such a benefit can present a great advantage for a compact configuration for the analysis of multiple components in complex chemical mixtures in a single test.

In some embodiments, the control lanthanide containing phosphorous compound is mounted directly onto the control platform without a binder; in some embodiments, the detection lanthanide containing phosphorous compounds are mounted directly onto the detection platform without a binder. The lanthanide containing phosphorous compounds disclosed herein possess a strong reactivity toward a wide variety of chemical compounds, presenting challenges for the analysis of a large number of different chemicals in a compact, portable probe format. The present disclosure addresses this challenge by providing chemical sensors including lanthanide containing phosphorous compounds mounted directly onto a control platform or a detection platform without the use of a binder, preventing reaction of the binder material with the lanthanide containing phosphorous compounds. In some embodiments, a binder can be used to adhere a bottom surface of the control platform or the detection platform to the sensor bearing surface, while the chemical sensors are mounted on a top surface of the control platform or the detection platform. In such embodiments, contact of the chemical sensors with the binder is avoided, thus providing an advantage of preventing reaction of the lanthanide containing phosphorous compounds with the binder, while allowing a compact, portable, inexpensive, disposable test format for analysis of multiple chemicals. In embodiments wherein the control platform or the detection platform includes a fibrous material, such embodiments can also provide a benefit of allowing the mounting of the chemical sensors in separate or discrete areas or shapes, further aiding the prevention of cross contamination between different chemical sensors.

In other embodiments, an adhesive layer is mounted onto the sensor bearing surface, and the array of luminescent chemical sensors is mounted directly onto the adhesive layer. In certain embodiments, such an adhesive layer can be sprayed onto the sensor bearing surface. In certain embodiments, the array of luminescent chemical sensors is selectively printed onto the adhesive layer. In certain embodiments, either of the control lanthanide containing phosphorous compounds and the detection lanthanide phosphorous containing compounds can be mounted onto an adhesive layer that is in turn mounted onto the control platform or the detection platform, respectively. In certain embodiments, the control lanthanide containing phosphorous compound, the detection lanthanide containing phosphorous compounds, or combinations thereof, can be sprayed by ink-jet, screen printing, or other methods of variable printing directly onto an adhesive layer, or directly onto the sensor bearing surface.

In certain embodiments, the sensor bearing surface is formed of a plastic, a paper, or wood, and the sensor bearing surface has a length and a width equal to or greater than the array of luminescent chemical sensors. In some embodiments, the sensor bearing surface forms a handle portion, which is located from about 1 mm to about 10 mm from the array of luminescent chemical sensors. In certain embodiments, the handle portion is located from about 3 mm to about 7 mm from the array of luminescent chemical sensors. Considering the broad reactivity of the lanthanide containing phosphorous compounds for different chemicals, any contact or contamination with a user's fingers or other user-introduced contamination can interfere with the correct functioning of the chemical sensors. A handle portion as disclosed herein can provide a benefit of allowing the handling of a probe without the need to touch the remainder of the sensor bearing surface, or the array of chemical sensors, thus preventing contamination of the chemical sensors and preventing potential false readings.

In certain embodiments, at least one of the control platform and the detection platform has a thickness of from about 0.1 mm to about 2 mm. In certain embodiments, at least one of the control platform and the detection platform has a thickness of from about 0.5 mm to about 1.5 mm. In certain embodiments, at least one of the control platform and the detection platform has a thickness of from about 0.7 mm to about 1.0 mm certain embodiments, at least one of the control platform and the detection platform has a longest measurement of from about 2 mm to about 60 mm. In certain embodiments, at least one of the control platform and the detection platform has a longest measurement of from about 10 mm to about 60 mm. In certain embodiments, at least one of the control platform and the detection platform has a longest measurement of from about 30 mm to about 40 mm. In some embodiments, at least one of the control area and the detection area have a square shape, a rectangular shape, a circular shape, an ovular shape, a triangular shape, a hexagonal shape, a polygonal shape, or a combination thereof. In certain embodiments, the control lanthanide containing phosphorous compound and the two or more detection lanthanide containing phosphorous compounds can be mounted onto the control area and the detection area, respectively, by being sprayed onto, ink-jetted onto, condensed onto, or embedded in the control area or the detection area. In certain embodiments, a fibrous material according to embodiments of the control platform or the detection platform can be contacted with one or more solutions containing the control lanthanide containing phosphorous compound or the two or more detection lanthanide containing phosphorous compounds, allowed to dry, and cut, stamped, or marked in order to form the control platform or the detection platform.

In certain embodiments, the probe includes an identification tag mounted on the sensor bearing surface. In certain embodiments, the identification tag includes an optical tag or a radio frequency tag. In certain embodiments, the identification tag is mounted on a bottom of the probe or on a handle of the probe. The performing of chemical tests presents challenges of keeping track of exactly what tests have been conducted with each probe; for example, has a particular probe been pre-scanned for sensor viability, has a control test been run, or has a detection test already been run, so that a second test should not be conducted? Such embodiments of probes including an identification tag can provide a solution to such challenges by allowing the tracking of a particular probe using a unique identification tag for each probe, to track which test steps have been conducted with each probe, and to match any pre-scanning or baseline test runs with subsequent detection measurements. Such embodiments can also provide an advantage of preventing the re-use of a probe after a detection test has been run.

Embodiments of the present disclosure can present an advantage of a chemical sensor configuration that allows the chemical sensor probes to display a unique eight-factor signature of color and brightness in response to the presence of a wide variety of chemicals present in chemical compositions. In various embodiments, an array of luminescent chemical sensors includes different lanthanide containing phosphorous compounds in varied ionic ratios configured to provide discernable responses in color and intensity of emitted light in response to the presence of a very different variety of chemical compounds. For example, such compounds can include solvents that differ from each other as much as methanol, water, and toluene, yet all such solvents can potentially be identified both qualitatively and quantitatively in a single assay. Such compounds can also include chemicals that are very similar to each other, for example, water and deuterium, yet compounds such as these can also be distinguished by the chemical analysis methods herein, even in trace amounts. Where one ionic weight ratio might provide a certain degree of specificity and sensitivity for chemical analysis, the addition of more weight ratios of lanthanide ions in the phosphorous compounds of the chemical sensors can add to the sensitivity and specificity of the analysis, still in a compact single assay format. In an embodiment, the array of luminescent chemical sensors includes at least four different weight ratio combinations of three different lanthanide ions included in the lanthanide containing phosphorous compounds. Each of the four weight ratio combinations among the array of chemical sensors provides a unique color signal and intensity signal in response to the presence of each chemical and chemical concentration, thus providing a unique eight-factor "fingerprint" for each chemical and chemical concentration, all readable in a single compact assay format.

In certain embodiments, the luminescent compounds can be purified before exposure to a chemical composition. In certain embodiments, the luminescent compound is heated prior to exposure to a chemical composition. In certain embodiments, the luminescent compound is dried prior to exposure to a chemical compound. Drying may include air drying, drying using a heat gun, drying using a vacuum, or other suitable drying method. In certain embodiments, purifying the luminescent compounds before exposure to a chemical composition reduces or eliminates the amount of solvents or impurities associated with synthesis of the luminescent compounds. Such embodiments can provide a benefit of increasing the accuracy and sensitivity of chemical analyses using the probes.

Lanthanide Containing Phosphorous Compounds of Various Embodiments

Embodiments of chemical sensor probes herein can include various luminescent compounds including a phosphorous atom with one or more carboxyl groups that are coordinated with one or more metallic ions. Such metallic ions can include one more lanthanide ions, yttrium ions, and combinations thereof.

In certain embodiments, the luminescent compounds can include one or more light absorbing groups. In certain embodiments, the light absorbing groups are coupled to the carboxyl groups. In some embodiments, the light absorbing groups can include one or more conjugated groups, aromatic groups, benzene groups, phenyl groups, aryl groups, alkene groups, alkyne groups, azides, and cyano groups.

The luminescent compounds of various embodiments can include various types of metallic ions. In some embodiments, the luminescent compounds can include a single metallic ion. In some embodiments, the luminescent compounds can include a plurality of the same metallic ions, or a plurality of different metallic ions. In certain embodiments, the luminescent compounds include a plurality of metallic ions at different weight ratios. In certain embodiments, such weight ratios can include 1:1, 2:1, 1:3, 3:1, 1:1:1, 2:1:1, 1:2:1, 1:1:2, 5:1, 1:5, 3:1:1, 1:1:3, 1:3:1, 10:1:5, 5:1:5 and combinations thereof. The luminescent compounds herein can possess a reactivity to a wide variety of chemical compounds, where the color and intensity of the light emitted in reaction with various chemical compounds can vary widely based not only on the particular compound but on the amount of the compound present in a chemical composition. The luminescent compounds herein can vary substantially in the color and intensity of emitted light in response to the identity and concentrations of various chemical compounds, depending on the particular metallic ions included in the luminescent compounds, the number of different metallic ions included, and also the particular weight ratios of the different metallic ions included in the luminescent compounds. In various embodiments of probes herein, the identity, number, and weight ratios of different metallic ions included in the luminescent compounds can thus be varied in order to provide a benefit of greatly increased specificity and sensitivity for the detection of a wide variety of chemical compounds in a chemical composition.

In certain embodiments, the control lanthanide containing phosphorous compound includes one rare earth ion selected from the group consisting of La, Ce, Pr, Nd, Pm, Sm, Eu, Gd, Tb, Dy, Ho, Er, Tm, Yb, Lu, and Y. In certain embodiments, the combination of two or more detection lanthanide containing phosphorous compounds includes at least 2 different rare earth ions, wherein the rare earth ions are selected from the group consisting of La, Ce, Pr, Nd, Pm, Sm, Eu, Gd, Tb, Dy, Ho, Er, Tm, Yb, Lu, and Y. In some embodiments, the combination of two or more detection lanthanide containing phosphorous compounds includes Tb, Eu, and Tm. In some embodiments, the combination of two or more detection lanthanide containing phosphorous compounds includes Eu, Gd, and Tb.

The phosphorous atoms of the luminescent compounds can be in various forms. In certain embodiments, the phosphorous atoms can be in non-oxidized form. In certain embodiments, the phosphorous atoms can be oxidized. In certain embodiments, the phosphorous atoms can be oxidized by post-synthetic oxidation methods.

In certain embodiments, the luminescent compounds can have various structures. In certain embodiments, the luminescent compounds are porous, or in the form of a crystalline lattice. In certain embodiments, the metallic ions in the luminescent compounds coordinate with carboxyl groups on adjacent luminescent compounds to form a crystalline lattice. In some embodiments, the luminescent compounds have a honeycomb-like structure, are in the form of two-dimensional honeycomb sheets, stacked in an eclipsed arrangement to result in a three-dimensional solid having large hexagonal channels, or a combination thereof.

In certain embodiments, the luminescent compounds have various surface areas. In certain embodiments, the luminescent compounds have surface areas of from about 50 $m^2/g$ to about 1000 $m^2/g$. In certain embodiments, the luminescent compounds have surface areas of from about 250 $m^2/g$ to about 800 $m^2/g$. In certain embodiments, the luminescent compounds have surface areas of from about 500 $m^2/g$ to about 750 $m^2/g$. In certain embodiments, the luminescent compounds have surface areas of from about 500 $m^2/g$ to about 600 $m^2/g$.

The luminescent compounds can have various quantum yields. In some embodiments, the luminescent compounds have absolute quantum yields of photoluminescence WO that range from about 20% to about 95%. In certain embodiments, the luminescent compounds have $\Phi_{PL}$ values that range from about 35% to about 95%. In certain embodiments, the luminescent compounds have $\Phi_{PL}$ values that range from about 50% to about 90%. In certain embodiments, the luminescent compounds have $\Phi_{PL}$ values that range from about 80% to about 90%.

In certain embodiments, the array of luminescent chemical sensors includes a lower wavelength control sensor and a higher wavelength control sensor. In such embodiments, the lower wavelength control sensor contains a lower wavelength ion X, and the higher wavelength control sensor contains a higher wavelength ion Z, wherein X and Z are different. In such embodiments, the array of luminescent chemical sensors includes at least one detection sensor containing a weight ratio of the lower wavelength ion X to the higher wavelength ion Z, wherein the weight ratio ranges from about 10:1 X:Z to about 1:10 X:Z. In certain embodiments, the weight ratio ranges from about 8:1 X:Z to about 1:8 X:Z. In certain embodiments, the weight ratio ranges from about 5:1 X:Z to about 1:5 X:Z.

In certain embodiments, the at least one detection sensor includes at least 2 lanthanide ions selected from the group consisting of Eu, Gd, and Tb; and wherein a weight ratio of the at least 2 lanthanide ions includes about 5:1 Tb:Eu, about 1:5 Tb:Eu, about 1:1:1 Eu:Gd:Tb, about 3:1:1 Eu:Gd:Tb, about 1:1:3 Eu:Gd:Tb, or about 1:3:1 Eu:Gd:Tb. In certain embodiments, a weight ratio of the at least 2 lanthanide ions includes about 4:1 Tb:Eu, about 3:1 Tb:Eu, about 2:1 Tb:Eu, about 1:1 Tb:Eu, about 1:4 Tb:Eu, about 1:3 Tb:Eu, about 1:2 Tb:Eu, about 2:1:1 Eu:Gd:Tb, about 1:2:1 Eu:Gd:Tb, about 1:1:2 Eu:Gd:Tb, or combinations thereof.

Embodiments of Methods of Analyzing a Chemical Composition

The present disclosure relates to methods of analyzing a chemical composition. In various embodiments, the method includes providing a mobile chemical sensor device and providing a chemical sensor probe. In various embodiments, the chemical sensor probe includes an array of luminescent chemical sensors on a sensor-bearing surface. In various embodiments, the method includes contacting the chemical sensor probe with a chemical composition for a test duration; inserting a cartridge holding the chemical sensor probe into the mobile chemical sensor device; exposing the chemical sensor probe to a test range of light; and detecting a color and an intensity of luminescence of the array of luminescent chemical sensors. In such embodiments, the mobile chemical sensor device includes a housing including a cartridge opening configured to position the cartridge holding the chemical sensor probe, wherein the cartridge forms a light sealed enclosure in an interior of the housing when the cartridge is inserted in the cartridge opening. In such embodiments, at least one light source is configured to direct light onto the sensor-bearing surface of the chemical sensor probe at an angle of incidence. In certain embodiments, the light source is capable of emitting light having a wavelength of from about 280 nm to about 400 nm. In certain embodiments, the light source is capable of emitting light having a wavelength of from about 300 nm to about 380 nm. In certain embodiments, the light source is capable of emitting light having a wavelength of from about 320 nm to about 360 nm. In such embodiments, a camera module is mounted in the light sealed enclosure and configured to detect emitted light from the chemical sensor probe.

Methods herein include providing a chemical sensor probe. In certain embodiments, a chemical sensor probe includes an array of luminescent chemical sensors mounted on a sensor bearing surface or a base layer, wherein the array of luminescent chemical sensors includes at least one control sensor and at least one detection sensor, wherein the at least one control sensor includes a control lanthanide containing phosphorous compound mounted onto a control area of a control platform and the at least one detection sensor includes a combination of two or more detection lanthanide containing phosphorous compounds mounted onto a detection area of a detection platform, wherein the control platform and the detection platform are adhered to the sensor bearing surface.

Methods herein include contacting a chemical sensor probe with a chemical composition. The probes can be contacted with various chemical compositions. In certain embodiments, the chemical composition is in a liquid phase or a vapor phase, or combinations thereof. In certain embodiments, the chemical composition includes a solid. In certain embodiments including a liquid chemical composition, the liquid can include solutions, solvent feedstocks, environmental water solutions, reservoirs, waste water, and combinations thereof. In certain embodiments, the chemical composition includes air. In certain embodiments, the chemical composition is a sample of its native form. In certain embodiments, the chemical composition includes a solvent. Such a solvent can include various solvents from the environment, or an industrial or laboratory solvent. In certain embodiments, the solvent includes a single solvent or more than one solvent. In certain embodiments, the solvent includes a liquid, a gas, a solid, or a combination thereof. In certain embodiments, the solvent includes an organic solvent, an inorganic solvent, or combination thereof. In certain embodiments, the solvent includes or more of water, alcohols, dioxane, toluene, dimethyl formamide, hexanes, chloroform, acetonitrile, pyridine, deuterium oxide, and combinations thereof. In certain embodiments, the solvent includes one or more of D2O, dimethylsulfoxide, methanol, ethanol, acetone, n-propanol, butanone, dichloromethane, diethyl ether, benzene, hexane, and combinations thereof. In certain embodiments, the chemical composition includes one or more solutes. Such a solute can include, without limitation, sodium fluoride, sodium chloride, sodium bromide, sodium iodide, and combinations thereof. In certain embodiments, the one or more solvents includes a trace chemical or a trace contaminant in the chemical composition. Such embodiments can provide a benefit of the high-capacity analysis of multi-phase fluids, organics, liquids, vapors, and gases.

Embodiments of methods herein include contacting the chemical sensor probe with the chemical composition for a test duration. Such a test duration in various embodiments can range from about 1 second to 20 minutes. Generally, if a test is carried out too quickly, then the material may not be saturated with analyte, resulting in an erroneous reading. For example, in some purity tests, if a reading was taken too quickly, it would give a higher purity reading due to the fact the material has not had time to properly react with the analyte.

In certain embodiments, one or more chemical compositions can be contacted with the probe for one or more test durations. In certain embodiments, methods herein allow immediate solvent identification by color changes visible to the naked eye upon contact of the probe with a chemical composition. In certain embodiments, the method includes pre-scanning the array of luminescent chemical sensors prior to contacting the probe with the chemical composition for the test duration. Such embodiments can provide a benefit of providing a calibration or "baseline" reading of the chemical sensors before they are reacted with a chemical composition, thus helping to ensure there is no contamination of the probe and that the chemical sensors have the necessary viability before performing a chemical analysis.

Embodiments of methods herein include exposing the probe to a test range of light; in an embodiment, the test range of light includes light in a range of from about 280 nm to about 400 nm. In certain embodiments, the test range of light includes light in a range of from about 300 nm to about 380 nm. In certain embodiments, the test range of light includes light in a range of from about 320 nm to about 350 nm. In such embodiments, interaction between the luminescent chemical sensors and one or more chemicals in the chemical composition results in emission of a specific signature color and intensity of visible light by the luminescent chemical sensors, upon exposing the probe to a test range of light. In certain embodiments, a particular chemical in a chemical composition produces a unique eight-factor signature of color and brightness; this light signature can be used to identify and quantify the chemicals present in the chemical composition.

In certain embodiments, provided there is at least one chemical substance in the chemical composition, the method further includes identifying the at least one chemical substance in the chemical composition by measuring the color and the intensity of luminescence of the array of luminescent chemical sensors. In certain embodiments, provided there is at least one chemical substance in the chemical composition, the method includes measuring a concentration of a chemical substance in the chemical composition by measuring the color and the intensity of luminescence of the array of luminescent chemical sensors. Such embodiments can provide a benefit of not only detecting but measuring chemical targets. In other embodiments, such methods can allow quantitative chemical analysis by simple spectrophotometry, compatible with a broad range of solvents yielding results in minutes, not days. In certain embodiments, the chemical composition is in a liquid or a vapor phase. In certain embodiments, the at least one chemical substance includes deuterium, and the chemical composition includes water. Such embodiments can provide a benefit of detection of low levels of water in solvents, allowing for a variety of quality assurance testing.

In certain embodiments, the method includes measuring the concentration of the at least one chemical substance in the chemical composition by comparing a ratio of wavelengths of luminescence emitted by a test sample to wavelengths of luminescence emitted by a concentration standard. In certain embodiments, the wavelengths of luminescence emitted by a concentration standard are in the range of visible light. In certain embodiments, the ratio is a ratio of visible wavelengths of light. In certain embodiments, the ratio of wavelengths of luminescence emitted by a test sample includes a ratio of 543 nm/616 nm. In certain embodiments, the ratio of wavelengths of luminescence emitted by a test sample includes a ratio of 543 nm/616 nm/510 nm.

In an embodiment, the method can average the RGB (red, green, blue) intensity of the test strips as captured by the camera module and use these averaged intensity values to translate into the XYZ color space (or Yxy more specifically) to allow it to be mapped onto a CIE 1931 color chart (created by the International Commission on Illumination (CIE) in 1931).

In certain embodiments, the method can average the RGB (red, green, blue) intensity of the test strips as captured by the camera module and transform them to a calibrated color space such that the measured color values on different devices agree. The parameters of this transform may be determined during device assembly and/or updated by end users as part of a calibration procedure.

In certain embodiments, the method further includes pre-scanning the array of luminescent chemical sensors in a baseline or calibration reading step prior to contacting the chemical sensor probe with the chemical composition for the test duration. In certain embodiments, the method further includes measuring a concentration of at least one chemical substance in the chemical composition by comparing a ratio of wavelengths of luminescence emitted by a test sample to wavelengths of luminescence emitted by a concentration standard.

In certain embodiments, the method further includes identifying an identification code of the chemical sensor probe by scanning an optical tag or a radio frequency tag mounted on the chemical sensor probe; matching the identification code to an eligible identification code in a database; measuring emitted light from the array of luminescent chemical sensors in a baseline reading step, providing baseline data from the chemical sensor probe and forming a pre-scanned chemical sensor probe; identifying the identification code of the pre-scanned chemical sensor probe by scanning the optical tag or the radio frequency tag mounted on the pre-scanned chemical sensor probe; matching the identification code to an eligible identification code of a pre-scanned chemical sensor probe in the database; and measuring emitted light from the array of luminescent chemical sensors in a test reading step, providing test data from the pre-scanned chemical sensor probe. In certain embodiments, the method further includes identifying an identification code of the chemical sensor probe by scanning an optical tag or a radio frequency tag mounted on the chemical sensor probe; matching the identification code to an ineligible code in a database; and sending an error signal. Such embodiments can provide a benefit of avoiding user error; for example, attempting to read a sample without having first performed a calibration step on the chemical sensor probe, or attempting to take a second sample reading on a "used" chemical sensor probe. Such embodiments can provide benefits of a mobile chemical sensor device that is simple to use, that is resistant to user error, and that can be easily used effectively by field staff having minimal training.

Embodiments of Computers, Communication Links, and User Interfaces

Figure 7:
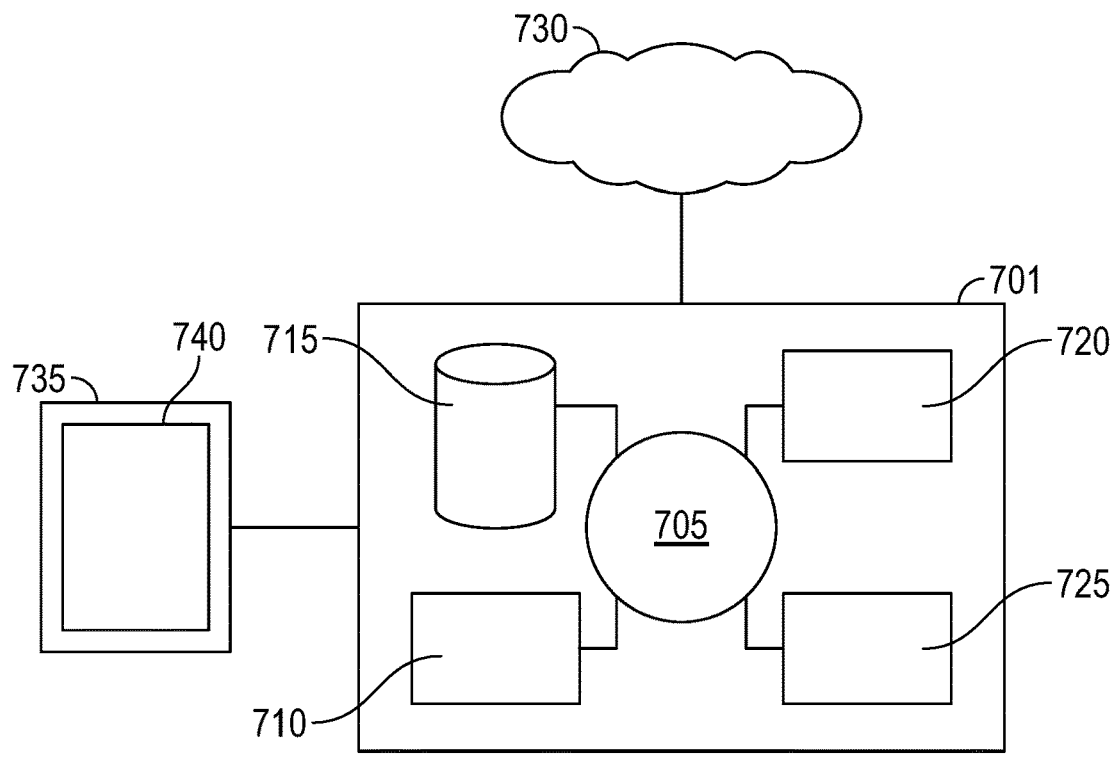
FIG. 7 shows a schematic diagram depicting a computer system according to some embodiments herein.

In some embodiments, the present disclosure can provide computer systems that are programmed to implement methods of the disclosure, such as, for example, a single-board computer or a multi-board computer that includes a computer readable code that operates the chemical sensor device. In various embodiments, the computer readable code is configured to receive and process at least one digital signal from the camera module of the chemical sensor device. FIG. 7 shows a computer system 701 that includes a central processing unit (CPU, also "processor" and "computer processor" herein) 705, which can be a single core or multi core processor, or a plurality of processors for parallel processing. In some embodiments, the computer system 701 also includes memory or memory location 710 (e.g., random-access memory, read-only memory, flash memory), electronic storage unit 715 (e.g., hard disk, memory card, USB storage device), communication link 720 (e.g., network adapter) for communicating with one or more other systems, such as a short-range wireless connection, a Universal Serial Bus (USB) connection, a memory card connection, or combination thereof; and peripheral devices 725, such as cache, other memory, data storage and/or electronic display adapters. In some embodiments, the memory 710, storage unit 715, communication link 720 and peripheral devices 725 are in communication with the CPU 705 through a communication bus (solid lines), such as a motherboard. In some embodiments, the storage unit 715 can be a data storage unit (or data repository) for storing data. In some embodiments, the computer system 701 can be operatively coupled to a computer network ("network") 730 with the aid of the communication link 720. In some embodiments, the network 730 can be the Internet, an intranet and/or extranet, or an intranet and/or extranet that is in communication with the Internet. In some embodiments, the network 730 in some cases is a telecommunication and/or data network. In some embodiments, the network 730 can include one or more computer servers, which can enable distributed computing, such as cloud computing. In some embodiments, the network 730, in some cases with the aid of the computer system 701, can implement a peer-to-peer network, which may enable devices coupled to the computer system 701 to behave as a client or a server.

In some embodiments, the CPU 705 can execute a sequence of machine-readable instructions, which can be embodied in a program or software. In some embodiments, the instructions may be stored in a memory location, such as the memory 710. In some embodiments, the instructions can be directed to the CPU 705, which can subsequently program or otherwise configure the CPU 705 to implement methods of the present disclosure. Examples of operations performed by the CPU 705 can include fetch, decode, execute, and writeback.

In some embodiments, the CPU 705 can be part of a circuit, such as an integrated circuit. In some embodiments, one or more other components of the system 701 can be included in the circuit. In some cases, the circuit is an application specific integrated circuit (ASIC).

In some embodiments, the storage unit 715 can store files, such as drivers, libraries and saved programs. In some embodiments, the storage unit 715 can store user data, e.g., user preferences and user programs. In some embodiments, the computer system 701 in some cases can include one or more additional data storage units that are external to the computer system 701, such as located on a remote server that is in communication with the computer system 701 through an intranet or the Internet.

In some embodiments, the computer system 701 can communicate with one or more remote computer systems through the network 730. For instance, the computer system 701 can communicate with a remote computer system of a user. Examples of remote computer systems include personal computers (e.g., portable PC), slate or tablet PC's (e.g., APPLE® iPad, SAMSUNG® Galaxy Tab), telephones, Smart phones or mobile phones (e.g., APPLE® iPhone, Android-enabled device, BLACKBERRY®), other mobile devices, or personal digital assistants. In some embodiments, the user can access the computer system 701 via the network 730.

In some embodiments, methods as described herein can be implemented by way of machine (e.g., computer processor) executable code stored on an electronic storage location of the computer system 701, such as, for example, on the memory 710 or electronic storage unit 715. In some embodiments, the machine executable or machine-readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. In some embodiments, "storage" type media can include any or all of the tangible memory of the computers, processors or the like, or associated modules thereof, such as various semiconductor memories, tape drives, disk drives and the like, which may provide non-transitory storage at any time for the software programming. In some embodiments, all or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In some embodiments, the computer system 701 can include or be in communication with an electronic display 735 that comprises a user interface (UI) 740 for providing, for example, test data for at least one chemical composition. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, implement methods for collecting test data for at least one chemical composition.

Various embodiments of the present disclosure are illustrated by but not limited by the following examples. Those skilled in the art will recognize many equivalent techniques for accomplishing the steps or portions of the steps enumerated herein.

EXAMPLES

Example 1: Chemical Analysis Method Using the "LanthaHD" Application

1. Select the "LanthaHD" program on the application menu.
2. Enter the required information for name of user, test name, and name of sample.
3. Calibrate an activated chemical sensor probe test strip by inserting the test strip positioned in the cartridge into the cartridge opening of the mobile chemical sensor device housing, and select the "Calibrate" function from the program menu. During the "Calibrate" step, the device should log an image of the test strip and process the average RGB values of each step. This does not necessarily need to be seen by the end user, but should reference the RGB values to pre-programmed RGB values to ensure that the test strip has not degraded.
4. There will be an error message if there is a problem with the calibration, i.e. if the UV lamp is off, or the test strip is not aligned with the camera, the test strip has degraded, etc. Address any errors indicated and repeat the calibration step if necessary.
5. When a successful calibration reading has been obtained, remove the test strip in the cartridge from the device, and contact the calibrated test strip with the sample. Wait for the required test period after selecting the "Start Timer" function on the application.
6. Insert the test strip in the cartridge into the cartridge opening of the device and select the "Collect Data" function on the application. The application reads from the sensor and performs a computation based on the collected data from the individual chemical sensors Selection of the "Confirm/New Test" button is required to ensure users are satisfied with the captured image. The Data Analysis screen requires the rapid sampling of pixels in the designated area, taking the respective RGB values, averaging and reporting the values. On the Data Analysis screen, average RGB values are shown as well as the ratio of red to green light which are compared to a table of known materials to create a match based on color and intensity of emitted light. Users can also review the captured image and see the averaged RGB and red to green ratio results.
7. Behind the scenes, the ratio of red to green light is compared to a calibration curve. The calibration curve maps known concentrations to specific color values and is used to determine the percentage of O-D bonds in the chemical sample.
8. The percentage of O-D bonds in the chemical sample are reported in the results on the Results screen, showing the percentage purity of the main material, i.e. the percentage of H2O to D2O in the sample. Based on the output from the calibration curve, this screen will simply report the percent purity with a percent error based upon the uncertainty in the measurement. End users should be able to save and print this screen as proof of purity to be attached to any shipments. The "Save Test" or "New Test" button can be selected as appropriate.

What is claimed is:

1. A mobile chemical sensor device comprising:
   a housing including a cartridge opening;
      a cartridge configured to position at least one chemical sensor probe having a sensor-bearing surface that includes an array of luminescent chemical sensors, wherein the cartridge forms a light sealed enclosure in an interior of the housing when the cartridge is inserted in the cartridge opening;
      at least one light source configured to direct light onto the sensor-bearing surface of the at least one chemical sensor probe at an angle of incidence, wherein the light source is capable of emitting light having a wavelength of from about 280 nm to about 400 nm; and
      a camera module mounted in the light sealed enclosure and configured to detect emitted light from the at least one chemical sensor probe,
      wherein the cartridge is configured to display an area of the sensor-bearing surface having a display length of about 15 mm to about 50 mm and a display width of from about 1 mm to about 20 mm, and
      wherein the at least one chemical sensor probe has a probe thickness of from about 0.1 mm to about 2 mm, a probe length of from about 20 mm to about 60 mm, and a probe width of from about 2 mm to about 30 mm, or
      wherein at least one of the housing and the light sealed enclosure include a gas intake and a gas exhaust, and wherein the gas intake and the gas exhaust are configured to allow a sample gas to flow across the sensor-bearing surface of the at least one chemical sensor probe.

2. The mobile chemical sensor device of claim 1, further comprising:
   an optical mirror configured to reflect emitted light from the at least one chemical sensor probe to the camera module;

a single-board computer or a multi-board computer mounted in the light sealed enclosure; or at least one communication link between a single-board computer or multi-board computer and at least one user interface.

3. The mobile chemical sensor device of claim 2, wherein the at least one communication link includes a short-range wireless connection, a Universal Serial Bus (USB) connection, a memory card connection, or a combination thereof; or the at least one user interface includes a mobile device having an operating system capable of running downloaded applications, a mobile phone, a computer, or a combination thereof.

4. The mobile chemical sensor device of claim 2, further comprising a printed circuit board assembly (PCBA) mounted in the light sealed enclosure and connected to the single-board computer or multi-board computer;

further comprising a battery mounted in an interior of the housing; or a battery station mounted in an interior of the housing.

5. The mobile chemical sensor device of claim 4, wherein the PCBA and the single-board computer are connected by a pin connector or a cable assembly, or wherein the PCBA is connected to the single-board computer by an adapter board, or wherein the PCBA is directly connected to the single-board computer, or wherein the light source is mounted on the PCBA.

6. The mobile chemical sensor device of claim 4, further comprising a cartridge detection sensor mounted to the PCBA.

7. The mobile chemical sensor device of claim 2, wherein the housing includes an external USB port, an external memory card connector, an external shutter button, an external short-range wireless connector, an external power switch, or a combination thereof.

8. The mobile chemical sensor device of claim 2, wherein the optical mirror includes a protective silver coating, or wherein the optical mirror is capable of reflecting from about 70% to 100% of the emitted light.

9. The chemical sensor device of claim 2, wherein the chemical sensor device is operated by a computer readable code included in the single-board or the multi-board computer, and the computer readable code is configured to receive and process at least one digital signal from the camera module.

10. The mobile chemical sensor device of claim 1, wherein the camera module includes a charged coupled device or a complementary metal oxide semiconductor (CMOS) image sensor; the camera module includes a camera having a micro-lens, an M12 lens, an S-Mounted lens, or a lens configured to focus light at a distance of from about 5 cm to about 25 cm from a surface of the lens; or the camera module includes a light transparent protective cover between a camera and the at least one chemical sensor probe.

11. The mobile chemical sensor device of claim 1, wherein the cartridge is removable from the housing; or the cartridge includes at least one tray recess configured to accommodate the at least one chemical sensor probe and is configured to reversibly slide into and out of the cartridge opening along a track.

12. The mobile chemical sensor device of claim 11, wherein at least one of the cartridge and the housing include a gas intake and a gas exhaust, and wherein the gas intake and the gas exhaust are configured to allow a sample gas to flow across the sensor-bearing surface of the at least one chemical sensor.

13. The mobile chemical sensor device of claim 1, wherein the light source includes a light emitting diode, a mercury vapor lamp, a halogen lamp, or a laser; or wherein the angle of incidence is from about 5 degrees to about 90 degrees.

14. The mobile chemical sensor device of claim 1, wherein the chemical sensor probes include luminescent compounds, and wherein the luminescent compounds include a phosphorous atom with one or more carboxyl groups that are coordinated with one or more metallic ions.

15. A mobile chemical sensor device comprising:

a housing including a cartridge opening;

a cartridge configured to position at least one chemical sensor probe having a sensor-bearing surface that includes an array of luminescent chemical sensors, wherein the cartridge forms a light sealed enclosure in an interior of the housing when the cartridge is inserted in the cartridge opening;

at least one light source configured to direct light onto the sensor-bearing surface of the at least one chemical sensor probe at an angle of incidence, wherein the light source is capable of emitting light having a wavelength of from about 280 nm to about 400 nm;

a camera module mounted in the light sealed enclosure and configured to detect emitted light from the at least one chemical sensor probe;

an optical mirror configured to reflect emitted light from the at least one chemical sensor probe to the camera module; and a single-board computer or a multi-board computer mounted in the light sealed enclosure;

a printed circuit board assembly (PCBA) mounted in the light sealed enclosure and connected to the single-board computer or multi-board computer; and a light source board mounted in an adjustable position on the PCBA, wherein the at least one light source is mounted on the light source board, and wherein the light source board is configured to adjust the angle of incidence between the at least one light source and the sensor-bearing surface of the chemical sensor probe.

16. A mobile chemical sensor device comprising:

a housing including a cartridge opening;

a cartridge configured to position at least one chemical sensor probe having a sensor-bearing surface that includes an array of luminescent chemical sensors, wherein the cartridge forms a light sealed enclosure in an interior of the housing when the cartridge is inserted in the cartridge opening;

at least one light source configured to direct light onto the sensor-bearing surface of the at least one chemical sensor probe at an angle of incidence, wherein the light source is capable of emitting light having a wavelength of from about 280 nm to about 400 nm; and a camera module mounted in the light sealed enclosure and configured to detect emitted light from the at least one chemical sensor probe, wherein the housing has a housing height of about 3 cm to about 7 cm, a housing width of from about 7 cm to about 11 cm, and a housing length of from about 10 cm to about 20 cm; or wherein the mobile chemical sensor device has a weight of from about 45 grams to about 12,000 grams; or wherein a tag reader sensor is mounted in an interior of the housing, wherein the tag reader sensor is configured to read an optical tag or a radio frequency identification (RFID) tag located on one or more of the chemical sensor probes; or wherein at least one of the housing and the light sealed enclosure include a gas intake and a gas exhaust, and wherein the gas intake and the gas exhaust are configured to allow a sample gas to flow across the sensor-bearing surface of the at least one chemical sensor probe.

17. A mobile chemical sensor device comprising:
a housing including a cartridge opening;
a cartridge configured to position at least one chemical sensor probe having a sensor-bearing surface that includes an array of luminescent chemical sensors, wherein the cartridge forms a light sealed enclosure in an interior of the housing when the cartridge is inserted in the cartridge opening;
at least one light source configured to direct light onto the sensor-bearing surface of the at least one chemical sensor probe at an angle of incidence, wherein the light source is capable of emitting light having a wavelength of from about 280 nm to about 400 nm; and
a camera module mounted in the light sealed enclosure and configured to detect emitted light from the at least one chemical sensor probe,
an optical mirror configured to reflect emitted light from the at least one chemical sensor probe to the camera module; and
a single-board computer or a multi-board computer mounted in the light sealed enclosure; and
wherein the chemical sensor device is operated by a computer readable code included in the single-board or the multi-board computer, and the computer readable code is configured to receive and process at least one digital signal from the camera module,
wherein the at least one digital signal includes a plurality of RGB values derived from the emitted light from the at least one chemical sensor probe, a plurality of XYZ values derived from the plurality of RGB values, a plurality of xy values derived from the plurality of XYZ values, a data packet including one or more of a time, a date, a user name, a test name, a sample name; or combinations thereof; or
wherein the computer readable code includes a mandatory sequence of test protocol steps including at least one of a baseline reading step, a control reading step, and a sample reading step; or
wherein the at least one digital signal includes an image file.

18. A method of analyzing a chemical composition comprising:
providing a mobile chemical sensor device and a chemical sensor probe, wherein the chemical sensor probe includes an array of luminescent chemical sensors on a sensor-bearing surface;
contacting the chemical sensor probe with a chemical composition for a test duration;
inserting a cartridge holding the chemical sensor probe into the mobile chemical sensor device;
exposing the chemical sensor probe to a test range of light; and
detecting a color and an intensity of luminescence of the array of luminescent chemical sensors,
wherein the mobile chemical sensor device includes a housing including a cartridge opening configured to position the cartridge holding the chemical sensor probe, wherein the cartridge forms a light sealed enclosure in an interior of the housing when the cartridge is inserted in the cartridge opening;
at least one light source configured to direct light onto the sensor-bearing surface of the chemical sensor probe at an angle of incidence, wherein the light source is capable of emitting light having a wavelength of from about 280 nm to about 400 nm; and
a camera module mounted in the light sealed enclosure and configured to detect emitted light from the chemical sensor probe,
identifying an identification code of the chemical sensor probe by scanning an optical tag or a radio frequency tag mounted on the chemical sensor probe;
matching the identification code to an eligible identification code in a database;
measuring emitted light from the array of luminescent chemical sensors in a baseline reading step, providing baseline data from the chemical sensor probe and forming a pre-scanned chemical sensor probe;
identifying the identification code of the pre-scanned chemical sensor probe by scanning the optical tag or the radio frequency tag mounted on the pre-scanned chemical sensor probe;
matching the identification code to an eligible identification code of a pre-scanned chemical sensor probe in the database; and
measuring emitted light from the array of luminescent chemical sensors in a test reading step, providing test data from the pre-scanned chemical sensor probe.

19. The method of claim 18, provided there is at least one chemical substance in the chemical composition,
further comprising identifying the at least one chemical substance in the chemical composition by measuring the color and the intensity of luminescence of the array of luminescent chemical sensors; or
measuring a concentration of a chemical substance in the chemical composition by measuring the color and the intensity of luminescence of the array of luminescent chemical sensors.

20. The method of claim 18, further comprising,
pre-scanning the array of luminescent chemical sensors in a baseline reading step prior to contacting the chemical sensor probe with the chemical composition for the test duration; or
further comprising, measuring a concentration of at least one chemical substance in the chemical composition by comparing a ratio of wavelengths of luminescence emitted by a test sample to wavelengths of luminescence emitted by a concentration standard.

21. The method of claim 18, further comprising:
identifying an identification code of the chemical sensor probe by scanning an optical tag or a radio frequency tag mounted on the chemical sensor probe;
matching the identification code to an ineligible code in a database; and
sending an error signal.

* * * * *